United States Patent
Osada et al.

(10) Patent No.: US 10,035,927 B2
(45) Date of Patent: Jul. 31, 2018

(54) COLORING COMPOSITION FOR DECORATION, DECORATIVE MATERIAL, BASE MATERIAL HAVING DECORATIVE MATERIAL, TRANSFER MATERIAL, TOUCH PANEL, AND INFORMATION DISPLAY DEVICE

(71) Applicant: FUJIFILM Corporation, Tokyo (JP)

(72) Inventors: Shuichiro Osada, Fujinomiya (JP); Takashi Aridomi, Fujinomiya (JP); Saori Asada, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/425,218

(22) Filed: Feb. 6, 2017

(65) Prior Publication Data

US 2017/0145257 A1    May 25, 2017

Related U.S. Application Data

(63) Continuation of application No. PCT/JP2015/071768, filed on Jul. 31, 2015.

(30) Foreign Application Priority Data

Sep. 12, 2014   (JP) ................................ 2014-186156

(51) Int. Cl.
    C09D 5/29      (2006.01)
    C09D 183/04    (2006.01)
    C09D 17/00     (2006.01)

(52) U.S. Cl.
    CPC ............. *C09D 183/04* (2013.01); *C09D 5/29* (2013.01); *C09D 17/005* (2013.01); *C09D 17/008* (2013.01)

(58) Field of Classification Search
    None
    See application file for complete search history.

(56) References Cited

U.S. PATENT DOCUMENTS 5,684,060 A * 11/1997 Konings ................. A61K 6/10
                                                    264/16
6,101,636 A *  8/2000 Williams ............. A42B 3/0406
                                                    2/410
(Continued)

FOREIGN PATENT DOCUMENTS

JP       9-124990 A     5/1997
JP    2005-36154 A     2/2005
(Continued)

OTHER PUBLICATIONS

International Search Report, issued in PCT/JP2015/071768, dated Aug. 25, 2015.
(Continued)

*Primary Examiner* — Robert S Loewe
(74) *Attorney, Agent, or Firm* — Birch, Stewart, Kolasch & Birch, LLP

(57) ABSTRACT

A coloring composition for decoration includes a compound having at least a structure represented by Formula 1 in a molecule, a compound having at least a structure represented by Formula 2 in a molecule, and a pigment. In the formulae, $R^a$ represents a hydrogen atom, a halogen atom, an alkoxy group, an alkyl group, an alkenyl group other than a vinyl group, an aryl group, or an aralkyl group, and $R^b$ represents a halogen atom, an alkoxy group, an alkyl group, an alkenyl group, an aryl group, or an aralkyl group.

(Continued)

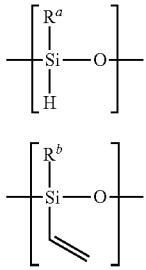

(1)

(2)

14 Claims, 6 Drawing Sheets

(56) References Cited

U.S. PATENT DOCUMENTS

| 7,700,712 | B2* | 4/2010 | Zech | A61K 6/10 |
| | | | | 528/31 |
| 2007/0275255 | A1* | 11/2007 | Ooms | C08G 77/44 |
| | | | | 428/447 |
| 2012/0045635 | A1* | 2/2012 | Aoki | C09J 183/04 |
| | | | | 428/220 |
| 2012/0157624 | A1 | 6/2012 | Saito | |
| 2014/0206816 | A1* | 7/2014 | Zhao | C09K 3/1018 |
| | | | | 524/786 |
| 2014/0375912 | A1 | 12/2014 | Gotoh et al. | |
| 2015/0092123 | A1 | 4/2015 | Gotoh et al. | |

FOREIGN PATENT DOCUMENTS

| JP | 2011-88982 A | 5/2011 |
| JP | 2013-218313 A | 10/2013 |
| JP | 2014-24316 A | 2/2014 |
| JP | 2014-137617 A | 7/2014 |
| WO | WO 2014/097803 A1 | 6/2014 |

OTHER PUBLICATIONS

Written Opinion of the International Searching Authority (PCT/ISA/237), issued in PCT/JP2015/071768, dated Aug. 25, 2015.
Japanese Office Action and English translation thereof, dated Jun. 6, 2017, for corresponding Japanese Application No. 2016-547771.
International Preliminary Report on Patentability and English translation of Written Opinion of the International Searching Authority, dated Mar. 14, 2017 in PCT/JP2015/071768 (Forms PCT/IB/373 and PCT/IB 237).

\* cited by examiner

COLORING COMPOSITION FOR DECORATION, DECORATIVE MATERIAL, BASE MATERIAL HAVING DECORATIVE MATERIAL, TRANSFER MATERIAL, TOUCH PANEL, AND INFORMATION DISPLAY DEVICE

CROSS-REFERENCE TO RELATED APPLICATIONS

This application is a Continuation of PCT International Application No. PCT/JP2015/71768, filed on Jul. 31, 2015, which claims priority under 35 U.S.C. § 119(a) to Japanese Patent Application No. 2014-186156, filed on Sep. 12, 2014. Each of the above application(s) is hereby expressly incorporated by reference, in its entirety, into the present application.

BACKGROUND OF THE INVENTION

1. Field of the Invention

The present invention relates to a coloring composition for decoration, a decorative material, a base material having a decorative material, a transfer material, a touch panel, and an information display device.

2. Description of the Related Art

Recently, in some of the electronic devices such as mobile phones, car navigations, personal computers, ticket vending machines, and bank terminals, a touch panel-type input device is disposed on the surface of a liquid crystal display device or the like, and, with reference to command images displayed on image display regions of the liquid crystal display device, information corresponding to the command images can be input by touching places in which the command images are displayed with a finger, a stylus, or the like.

The front plate of the input device (touch panel) can be provided with decorative layers having a variety of tones, and, recently, among those decorative layers, particularly for white decorative layers, there has been a demand for improving brightness and whiteness.

In addition, since there are cases in which white decorative materials alone allow routing circuits and the like in display devices to be visible to users, there has been another demand for using black decorative materials (in some cases, also referred to as light-blocking layers) or decorative materials colored to other colors in order to prevent routing circuits and the like from being visible.

As electrostatic capacitance-type input devices of the related art, electrostatic capacitance-type input devices described in JP2013-218313A, JP2014-24316A, and JP2014-137617A are known.

SUMMARY OF THE INVENTION

The present inventors carried out studies and consequently found that, in manufacturing processes, heating steps may cause thermal coloration attributed to the oxidation of organic materials and the impairing of tones.

In addition, the present inventors found that, although the invention described in JP2014-24316A describes a decorative material into which a silicone resin rarely causing thermal coloration is introduced, silicone resins accompany a condensation reaction while being heated, and thus there is a problem in that coated film-like decorative materials shrink during heating and are peeled off due to the generation of cracks or insufficient adhesion.

An object of the present invention is to provide a coloring composition for decoration which has excellent crack resistance during heating and can be used to obtain decorative materials rarely causing thermal coloration, a decorative material for which the coloring composition for decoration is used, a base material having a decorative material, a transfer material, a touch panel, and an information display device.

The object of the present invention has been achieved by the following means <1> or <9> to <13>. The means will be described together with preferred embodiments <2> to <8>.

<1> A coloring composition for decoration comprising: a compound having at least a structure represented by Formula 1 below in a molecule; a compound having at least a structure represented by Formula 2 below in a molecule; and a pigment.

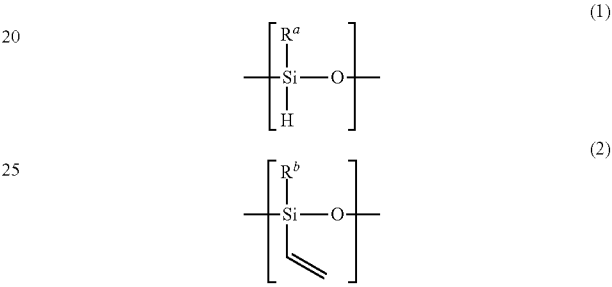

In Formulae 1 and 2, $R^a$ represents a hydrogen atom, a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms, and $R^b$ represents a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 2 to 20 carbon atoms, an aryl group having 6 to 20 carbon atoms, or an aralkyl group having 7 to 20 carbon atoms.

<2> The coloring composition for decoration according to <1>, in which the compound having at least the structure represented by Formula 1 in the molecule further has a structure represented by Formula 3 below.

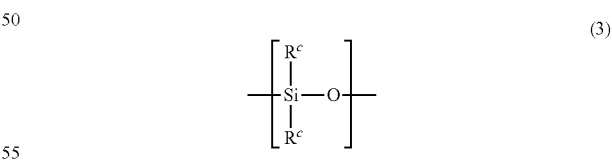

In Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

<3> The coloring composition for decoration according to <1> or <2>, in which the compound having at least the structure represented by Formula 2 in the molecule further has the structure represented by Formula 3 below.

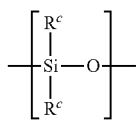

(3)

In Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

<4> The coloring composition for decoration according to any one of <1> to <3>, in which $R^a$ is a hydrogen atom, a methyl group, or a phenyl group, and $R^b$ is a methyl group or a phenyl group.

<5> The coloring composition for decoration according to any one of <1> to <4>, further comprising: a dispersing agent represented by Formula 4 below.

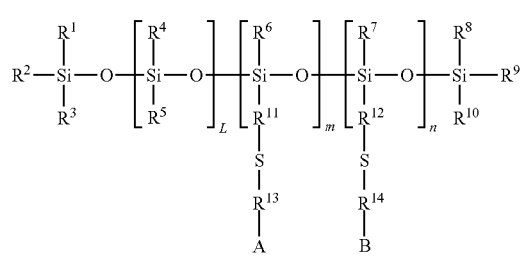

(4)

In Formula 4, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 5 below, L and n each independently represent an integer of 1 or more, and m represents an integer of 0 or more.

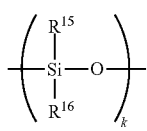

(5)

In Formula 5, $R^{15}$ and $R^{16}$ each independently represent a hydrogen atom, a hydroxy group, an aryl group, or an alkyl group having 1 to 3 carbon atoms, and k represents an integer of 1 or more.

<6> The coloring composition for decoration according to <5>, in which $R^1$ to $R^{10}$ each independently represent a hydrogen atom, a methyl group, or a phenyl group, and $R^{15}$ and $R^{16}$ each independently represent a hydrogen atom, a hydroxy group, a methyl group, or a phenyl group.

<7> The coloring composition for decoration according to any one of <1> to <6>, in which the pigment is titanium oxide or carbon black.

<8> The coloring composition for decoration according to any one of <1> to <7>, further comprising: a platinum compound.

<9> A transfer material for forming a decorative material comprising: the coloring composition for decoration according to any one of <1> to <8>.

<10> A decorative material made of the coloring composition for decoration according to any one of <1> to <8>.

<11> A base material having a decorative material comprising: the decorative material according to <10>; and a base material.

<12> A touch panel comprising: the decorative material according to <10> or the base material having a decorative material according to <11>.

<13> An information display device comprising: the touch panel according to <12>.

According to the present invention, it is possible to provide a coloring composition for decoration which has excellent crack resistance during heating and can be used to obtain decorative materials rarely causing thermal coloration, a decorative material for which the coloring composition for decoration is used, a base material having a decorative material, a transfer material, a touch panel, and an information display device.

DESCRIPTION OF THE PREFERRED EMBODIMENTS

Figure 1:
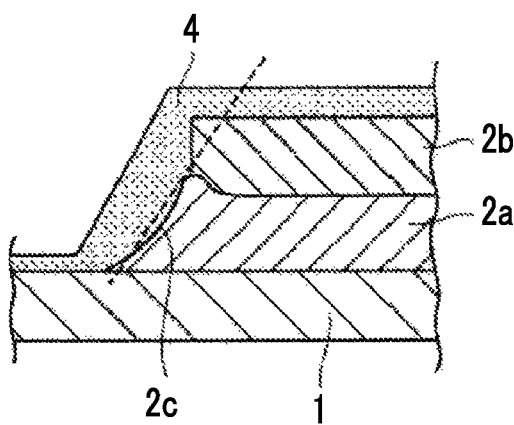
FIG. 1 is a partial enlarged cross-sectional view illustrating an example of a decorative material.

Hereinafter, the contents of the present invention will be described in detail. Hereinafter, constituent requirements will be described on the basis of typical embodiments of the present invention, but the present invention is not limited to those embodiments. Meanwhile, in the present specification, numerical ranges expressed using "to" includes numerical values before and after the "to" as the lower limit value and the upper limit value.

Regarding the expression of groups (atom groups) in the present specification, groups with no expression of 'substituted' or 'unsubstituted' refer to groups having no substituents and groups having a substituent. For example, "alkyl groups" refer not only to alkyl groups having no substituents (unsubstituted alkyl groups) but also to alkyl groups having a substituent (substituted alkyl groups).

Meanwhile, in the present specification, "(meth)acrylates" represent acrylates and methacrylates, "(meth)acryl" represent acryl and methacryl, and "(meth)acryloyl" represent acryloyl and methacryloyl.

In addition, in the present invention, "% by mass" and "% by weight" have the same meaning, and "parts by mass" and "parts by weight" have the same meaning.

In addition, in the present invention, a combination of preferred embodiments is a more preferred aspect.

In the present invention, the molecular weight of a polymer component is the polystyrene-equivalent weight-average molecular weight measured by means of gel permeation chromatography (GPC) in a case in which tetrahydrofuran (THF) is used as a solvent.

(Coloring Composition for Decoration)

A coloring composition for decoration of the present invention (hereinafter, also simply referred to as "coloring composition" or "composition") includes a compound having at least a structure represented by Formula 1 below (hereinafter, also referred to as "compound having the structure represented by Formula 1") in a molecule, a compound having at least a structure represented by Formula 2 below (hereinafter, also referred to as "compound having the structure represented by Formula 2") in a molecule, and a pigment.

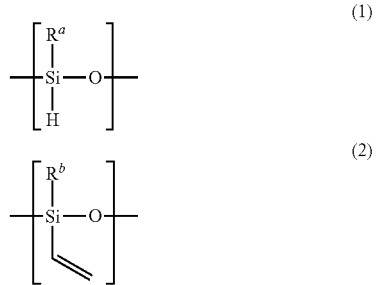

in Formulae 1 and 2, $R^a$ represents a hydrogen atom, a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms and $R^b$ represents a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 2 to 20 carbon atoms, an aryl group having 6 to 20 carbon atoms, or an aralkyl group having 7 to 20 carbon atoms.

As a result of repetitive intensive studies, the present inventors found that, when a compound having at least a structure represented by Formula 1 below in a molecule, a compound having at least a structure represented by Formula 2 below in a molecule, and a pigment are included, a decorative material which has excellent crack resistance during heating and rarely causes thermal coloration can be obtained.

In addition, the present inventors found that, when both decorative layers and light-blocking layers in touch panels and the like are formed of the coloring composition for decoration of the present invention, additional effects can be obtained.

The detailed development mechanism of the effects is unclear, but is assumed that the compound having at least the structure represented by Formula 1 in the molecule functions as a crosslinking agent, the hydrogen atom on the silicon atom in Formula 1 acts as a crosslinking group and reacts with a vinyl group on the silicon atom in the compound having at least the structure represented by Formula 2 in the molecule, the hydrosilylation of the vinyl group proceeds, a crosslinked structure is formed, and the effect can be obtained.

The coloring composition for decoration of the present invention can be preferably used as a coloring composition for white or black decoration and can be more preferably used as a coloring composition for white decoration.

In addition, the coloring composition for decoration of the present invention can be preferably used for transfer materials for forming decorative layers and can be more preferably used for transfer materials for white decorative layers.

In detail, the coloring composition for decoration of the present invention can be preferably used as a transfer layer for forming a decorative layer for transfer materials for decorative layers and can be more preferably used as a transfer layer for forming a white decorative layer for transfer materials for white decorative layers.

<Compound Having at Least Structure Represented by Formula 1 in Molecule>

The coloring composition for decoration of the present invention includes the compound having at least the structure represented by Formula 1 in the molecule.

In Formula 1, $R^a$ represents a hydrogen atom, a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

The compound having the structure represented by Formula 1 preferably has two or more structures represented by Formula 1.

In a case in which the compound has two or more structures represented by Formula 1, two or more $R^a$'s may be identical to or different from each other.

$R^a$ in Formula 1 is preferably a hydrogen atom, a linear, branched, or cyclic alkoxy group having 1 to 20 carbon atoms, a linear, branched, or cyclic alkyl group having 1 to 20 carbon atoms, an aryl group having 6 to 20 carbon atoms, or an aralkyl group having 7 to 20 carbon atoms, more preferably a hydrogen atom, a linear, branched, or cyclic alkyl group having 1 to 20 carbon atoms, or an aryl group having 6 to 20 carbon atoms, still more preferably a hydrogen atom, a methyl group, or a phenyl group, and particularly preferably a methyl group or a phenyl group.

In addition, the compound having the structure represented by Formula 1 is preferably a compound having no vinyl group on a silicon atom and a compound having no ethylenic unsaturated group.

Examples of the halogen atom as $R^a$ include a fluorine atom, a chlorine atom, and the like.

Examples of the linear, branched, or cyclic alkoxy group having 1 to 20 carbon atoms as $R^a$ include a methoxy group, an ethoxy group, an n-propoxy group, an i-propoxy group, an n-butoxy group, an i-butoxy group, a sec-butoxy group, a t-butoxy group, an n-pentyloxy group, an n-hexyloxy group, a cyclopentyloxy group, a cyclohexyloxy group, and the like.

Examples of the linear, branched, or cyclic alkyl group having 1 to 20 carbon atoms as $R^a$ include a methyl group, an ethyl group, an n-propyl group, an i-propyl group, an n-butyl group, an i-butyl group, a sec-butyl group, a t-butyl group, an n-pentyl group, an n-hexyl group, a cyclopentyl group, a cyclohexyl group, and the like. Among these linear, branched, or cyclic alkyl groups having 1 to 20 carbon atoms as $R^a$, an alkyl group having 1 to 3 carbon atoms is preferred, and a methyl group is more preferred.

In addition, examples of the linear, branched, or cyclic alkyl group having 1 to 20 carbon atoms as $R^a$ include an arylalkyl group, a fluoroalkyl group, a chloroalkyl group, a hydroxyalkyl group, a (meth)acryloxyalkyl group, and a mercaptoalkyl group. Specific examples thereof include arylalkyl groups such as phenylmethyl (benzyl) group, diphenylmethyl group, 1-phenylethyl group, 2-phenylethyl group, 1-phenyl-n-propyl group, 2-phenyl-2-propropyl (cumyl) group, 3-phenyl-n-propyl group, 1-phenylbutyl group, 2-phenylbutyl group, 3-phenylbutyl group, 4-phenylbutyl group, 1-phenylpentyl group, 2-phenylpentyl group, 3-phenylpentyl group, 4-phenylpentyl group, 5-phenylpentyl group, 1-phenylhexyl group, 2-phenylhexyl group, 3-phenylethylhexyl group, 4-phenylethylhexyl group, 5-phenylhexyl group, 6-phenylhexyl group, 1-phenylcyclohexyl group, 2-phenylcyclohexyl group, 3-phenylcyclohexyl group, 1-phenylheptyl group, 2-phenylnylheptyl group, 3-phenylheptyl group, 4-phenylheptyl group, 5-phenylheptyl group, 6-phenylheptyl group, 1-phenyloctyl group, 2-phenyloctyl group, 3-phenyloctyl group, 4-phenyloctyl group, 5-phenyloctyl group, 6-phenyloctyl group, 1-naphthylethyl group, 2-naphthylethyl group, 1-naphthyl-n-propyl group, 2-naphthyl-2-propyl group, 3-naphthyl-n-propyl group, 1-naphthylbutyl group, 2-naphthylbutyl group, 3-naphthylbutyl group, 4-naphthylbutyl group, 1-naphthylpentyl group, 2-naphthylpentyl group, 3-naphthylpentyl group, 4-naphthylpentyl group, 5-naphthylpentyl group, 1-naphthylhexyl group, 2-naphthylhexyl group, 3-naphthylhexyl group, 4-naphthylhexyl group, 5-naphthylhexyl group, 6-naphthylhexyl group, 1-naphthylcyclohexyl group, 2-naphthylcyclohexyl group, 3-naphthylcyclohexyl group, 1-naphthylheptyl group, 2-naphthylheptyl group, 3-naphthylheptyl group, 4-naphthylheptyl group, 5-naphthylheptyl group, 6-naphthylheptyl group, 1-naphthyloctyl group, 2-naphthyloctyl group, 3-naphthyloctyl group, 4-naphthyloctyl group, 5-naphthyloctyl group, and 6-naphthyloctyl group; fluoroalkyl groups such as fluoromethyl group, trifluoromethyl group, 2-fluoroethyl group, (trifluoromethyl) methyl group, pentafluoroethyl group, 3-fluoro-n-propyl group, 2-(trifluoromethyl) ethyl group, (pentafluoroethyl) methyl group, heptafluoro-n-propyl group, 4-fluoro-n-butyl group, 3-(trifluoromethyl)-n-propyl group, 2-(pentafluoroethyl) ethyl group, (heptafluoro-n-propyl) methyl group, nonafluoro-n-butyl group, 5-fluoro-n-pentyl group, 4-(trifluoromethyl)-n-butyl group, 3-(pentafluoroethyl)-n-propyl group, 2-(heptafluoro-n-propyl) ethyl group, (nonafluoro-n-butyl) methyl group, perfluoro-n-pentyl group, 6-fluoro-n-hexyl group, 5-(trifluoromethyl)-n-pentyl group, 4-(pentafluoroethyl)-n-butyl group, 3-(heptafluoro-n-propyl)-n-propyl group, 2-(nonafluoro-n-butyl) ethyl group, (perfluoro-n-pentyl) methyl group, perfluoro-n-hexyl group, 7-(trifluoromethyl)-n-heptyl group, 6-(pentafluoroethyl)-n-hexyl group, 5-(heptafluoro-n-propyl)-n-pentyl group, 4-(nonafluoro-n-butyl) n-butyl group, 3-(perfluoro-n-pentyl)-n-propyl group, 2-(perfluoro-n-hexyl) ethyl group, (perfluoro-n-heptyl) methyl group, perfluoro-n-octyl group, 9-(trifluoromethyl)-n-nonyl group, 8-(pentafluoroethyl)-n-octyl group, 7-(heptafluoro-n-propyl)-n-heptyl group, 6-(nonafluoro-n-butyl)-n-hexyl group, 5-(perfluoro-n-pentyl)-n-pentyl group, 4-(perfluoro-n-hexyl)-n-butyl group, 3-(perfluoro-n-heptyl)-n-propyl group, 2-(perfluoro-n-octyl) ethyl group, (perfluoro-n-nonyl) methyl group, perfluoro-n-decyl group, 4-fluorocyclopentyl group, and 4-fluorocyclohexyl group; chloromethyl group, 2-chloroethyl group, 3-chloro-n-propyl group, 4-chloro-n-butyl group, 3-chlorocyclopentyl group, 4-chlorocyclohexyl group, hydroxymethyl group, 2-hydroxyethyl group, 3-hydroxycyclopentyl group, 4-hydroxycyclohexyl group, 3-(meth)acryloxypropyl group, 3-mercaptopropyl group, and the like. Among the linear, branched, or cyclic alkyl groups having 1 to 20 carbon atoms as $R^a$, arylalkyl groups are preferred, and a cumyl group is more preferred.

In addition, examples of the linear, branched, or cyclic alkenyl group having 3 to 20 carbon atoms as $R^a$ include 1-methylvinyl group, 1-propenyl group, allyl group (2-propenyl group), 2-methyl-2-propenyl group, 1-butenyl group, 2-butenyl group, 3-butenyl group, 3-cyclopentenyl group, 3-cyclohexenyl group, and the like.

In addition, examples of the aryl group having 6 to 20 carbon atoms as $R^a$ include phenyl groups, o-tolyl group, m-tolyl group, p-tolyl group, 2,3-xylyl group, 2,4-xylyl group, 2,5-xylyl group, 2,6-xylyl group, 3,4-xylyl group, 3,5-xylyl group, 1-naphthyl group, and the like. Among the aryl groups having 6 to 20 carbon atoms as $R^a$, groups other than unsubstituted phenyl groups, that is, o-tolyl group, m-tolyl group, p-tolyl group, 2,3-xylyl group, 2,4-xylyl group, 2,5-xylyl group, 2,6-xylyl group, 3,4-xylyl group, 3,5-xylyl group, and 1-naphthyl group are preferred and o-tolyl group, m-tolyl group, and p-tolyl group are more preferred since benzene is not easily generated during heating. Meanwhile, from the viewpoint of easy procurement, phenyl groups are preferred.

In addition, examples of the aralkyl group having 7 to 20 carbon atoms as $R^a$ include benzyl group, phenethyl group, and the like.

The compound having at least the structure represented by Formula 1 in the molecule preferably further has a structure represented by Formula 3 below.

(3)

In Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

$R^c$'s in Formula 3 each independently are preferably a linear, branched, or cyclic alkoxy group having 1 to 20 carbon atoms, a linear, branched, or cyclic alkyl group having 1 to 20 carbon atoms, an aryl group having 6 to 20 carbon atoms, or an aralkyl group having 7 to 20 carbon atoms, more preferably a linear, branched, or cyclic alkyl group having 1 to 20 carbon atoms or an aryl group having 6 to 20 carbon atoms, and still more preferably a methyl group or a phenyl group.

Specific examples and preferred aspects of the halogen atom, the alkoxy group, the alkyl group, the alkenyl group, the aryl group, and the aralkyl group as $R^c$ are the same as the specific examples and preferred aspects of the halogen atom, the alkoxy group, the alkyl group, the alkenyl group, the aryl group, and the aralkyl group as $R^a$.

The compound having the structure represented by Formula 1 is preferably a compound having a silicone chain and more preferably a compound having a silicone chain in which the structure represented by Formula 1 and the structure represented by Formula 3 are combined together in an arbitrary order.

In addition, the compound having the structure represented by Formula 1 is preferably a linear silicone compound having the structure represented by Formula 1.

Furthermore, the total number of silicone bonds (—O—Si—O—) in the compound having the structure represented by Formula 1 needs to be one or more and is preferably 2 to 200, more preferably 5 to 100, and still more preferably 10 to 50.

In a case in which the compound having the structure represented by Formula 1 further has the structure represented by Formula 3, the molar ratio between the structure represented by Formula 1 and the structure represented by Formula 3 in the compound having the structure represented by Formula 1 is not particularly limited, but is preferably 10:1 to 1:100, more preferably 5:1 to 1:20, and still more preferably 2:1 to 1:10 (the structure represented by Formula 1:the structure represented by Formula 3).

The content of a hydroxyl group (Si—H) in the compound having the structure represented by Formula 1 is preferably 0.1 to 16.5 mmol/g and more preferably 1.0 to 10.0 mmol/g. When the content is in the above-described range, it is possible to obtain a decorative material which has superior crack resistance during heating and more rarely causes thermal coloration.

The molecular weight of the compound having the structure represented by Formula 1 is preferably 500 to 100,000, more preferably 1,000 to 50,000, and still more preferably 2,000 to 10,000. When the molecular weight is in the above-described range, sufficient curing properties can be obtained, and a cured film having superior crack resistance can be obtained.

The compound having the structure represented by Formula 1 may be used singly, or a mixture of two or more compounds may be used.

The content of the compound having the structure represented by Formula 1 is preferably 0.1% to 50% by mass, more preferably 0.5% to 30% by mass, and still more preferably 1% to 20% by mass of the total solid content amount of the coloring composition for decoration. Meanwhile, the "solid content" in the coloring composition for decoration refers to components excluding volatile components such as a solvent.

<Compound Having at Least Structure Represented by Formula 2 in Molecule>

The coloring composition for decoration of the present invention includes the compound having at least a structure represented by Formula 2 below in the molecule.

(2)

In Formula 2, $R^b$ represents a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 2 to 20 carbon atoms, an aryl group having 6 to 20 carbon atoms, or an aralkyl group having 7 to 20 carbon atoms.

The compound having the structure represented by Formula 2 preferably has two or more structures represented by Formula 2.

In a case in which the compound has two or more structures represented by Formula 2, two or more $R^b$'s may be identical to or different from each other.

$R^b$ in Formula 2 is preferably a linear, branched, or cyclic alkoxy group having 1 to 20 carbon atoms, a linear, branched, or cyclic alkyl group having 1 to 20 carbon atoms, an aryl group having 6 to 20 carbon atoms, or an aralkyl group having 7 to 20 carbon atoms, more preferably a linear, branched, or cyclic alkyl group having 1 to 20 carbon atoms or an aryl group having 6 to 20 carbon atoms, and still more preferably a methyl group or a phenyl group.

Specific examples and preferred aspects of the halogen atom, the alkoxy group, the alkyl group, the aryl group, and the aralkyl group as $R^b$ are the same as the specific examples and preferred aspects of the halogen atom, the alkoxy group, the alkyl group, the aryl group, and the aralkyl group as $R^a$.

In addition, as the alkenyl group as $R^b$, in addition to the above-described specific examples of the alkenyl group as $R^a$, a vinyl group can be preferably exemplified.

The compound having at least the structure represented by Formula 2 in the molecule preferably further has a structure represented by Formula 3 below.

(3)

In Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

$R^c$ in Formula 3 in the compound having the structure represented by Formula 2 is the same as $R^c$ in Formula 3 in the compound having the structure represented by Formula 1, and a preferred aspect thereof is also identical thereto.

The compound having the structure represented by Formula 2 is preferably silicone rubber and more preferably vinyl methyl silicone rubber or phenyl vinyl methyl silicone rubber. Meanwhile, the vinyl methyl silicone rubber in the present invention does not necessarily have a vinyl group on all of the silicon atoms and simply needs to have at least some of methyl groups on silicon atoms in methyl silicone rubber substituted with a vinyl group. In addition, the phenyl vinyl methyl silicone rubber does not necessarily have a vinyl group on all of the silicon atoms and simply needs to have at least some of methyl groups and/or phenyl groups on silicon atoms in phenyl methyl silicone rubber substituted with a vinyl group.

In addition, it is also possible to use a silicone rubber compound (silicone rubber precursor) which has a gum-like siloxane structure and is obtained by blending a variety of additives as necessary to the basic components of the compound having the structure represented by Formula 2 and particles (for example, silica) as a reinforcing material. When a vulcanizing agent such as an organic peroxide or a solvent is added as necessary to the silicone rubber compound during use, and the mixture is heated and cured, narrow-sense silicone rubber can be obtained. The scope of silicone rubber in the present invention includes both silicone rubber compounds and narrow-sense silicone rubber which has been heated and cured.

Examples of the silicone rubber also include silicone rubber obtained by crosslinking at least one type of silicone selected from the group consisting of linear polyorganosiloxane compounds having vinyl groups only at both terminals, linear polyorganosiloxane compounds having vinyl groups at both terminals and a side chain, branched polyorganosiloxane compounds having a vinyl group only at a terminal, and branched polyorganosiloxane compounds having vinyl groups at a terminal and a side chain.

The linear polyorganosiloxane compound having vinyl groups only at both terminals is a compound represented by any one of the following formulae. In addition, the linear polyorganosiloxane compound having vinyl groups at both terminals and a side chain is a compound in which some of $R^S$ in the above-described formulae is a vinyl group.

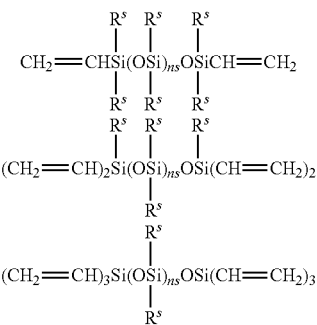

In the formulae, $R^s$ represents the following organic group, and ns represents an integer of 1 or more.

The branched polyorganosiloxane compounds having a vinyl group only at a terminal is a compound represented by the following formula. The branched polyorganosiloxane compounds having vinyl groups at a terminal and a side chain is a compound in which some of $R^s$ in the following formulae is a vinyl group.

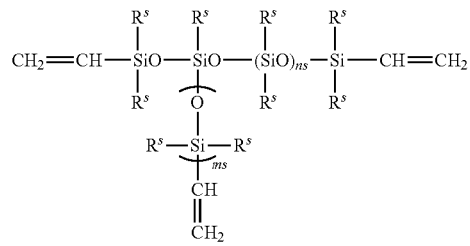

In the formula, $R^s$ represents the following organic group, ms represents an integer of 1 or more, and ns represents an integer of 1 or more.

The organic groups ($R^s$) other than vinyl groups which are bonded to a silicon atom may be identical to or different from each other, and specific examples thereof are preferably alkyl groups such as methyl groups, ethyl groups, or propyl groups, aryl groups such as phenyl groups or tolyl groups, or groups other than aliphatic unsaturated groups which are identical or different unsubstituted or substituted monovalent hydrocarbon groups in which some or all of the hydrogen atoms bonded to carbon atoms in the above-described groups are substituted with a halogen atom, a cyano group, or the like. In addition, preferred examples of the polyorganosiloxane compound include compounds in which at least 50 mol % of all of the $R^s$ is a methyl group. These polyorganosiloxane compound may be a pure compound or a mixture of two or more compounds.

Regarding the shape of a commercially available product of the silicone rubber which can be used in the present invention, it is possible to use any one of solventless-type silicone rubber, solvent-type silicone rubber, and emulsion-type silicone rubber. Among these, the solventless-type silicone rubber does not use any solvents and is thus extremely advantageous in terms of safety, sanitation, and air pollution. In a case in which the economic efficiency is taken into account, solventless-type silicone rubber is preferably used.

The silicone rubber preferably includes particles and more preferably includes inorganic particles.

That is, the coloring composition for decoration of the present invention preferably includes particles and more preferably includes inorganic particles.

Examples of the inorganic particles include silica, alumina, zirconia, barium sulfate, barium titanate, magnesium carbonate, calcium carbonate, mica, talc, clay, and the like.

Among these, at least one type of particles selected from the group consisting of silica, titania, and zirconia are particularly preferred.

The silicone rubber is preferably, for example, KE-109, KE-106, KE-1031, KE-103, KE-108, KE-581U, KE-167U, KE-153U, KE-5634U, KE-1820, and KE1886 which are manufactured by Shin-Etsu Chemical Co., Ltd. Among these, KE-581U, KE-167U, KE-153U, or KE-5634U is preferred.

The content of the vinyl group (Si—CH=CH$_2$) bonded onto a silicon atom in the compound having the structure represented by Formula 2 is preferably 0.1 to 11.5 mmol/g and more preferably 0.5 to 10.0 mmol/g. When the content is in the above-described range, it is possible to obtain a decorative material which has superior crack resistance during heating and more rarely causes thermal coloration.

The weight-average molecular weight of the compound having the structure represented by Formula 2 is preferably 1,000 to 5,000,000, more preferably 10,000 to 3,000,000, still more preferably 50,000 to 2,000,000, and particularly preferably 300,000 to 1,000,000. When the weight-average molecular weight is in the above-described range, sufficient curing properties can be obtained, and a cured film having superior crack resistance can be obtained.

The compound having the structure represented by Formula 2 may be used singly, or a mixture of two or more compounds may be used.

The content of the compound having the structure represented by Formula 2 is preferably 1% to 95% by mass, more preferably 5% to 90% by mass, and still more preferably 10% to 90% by mass of the total solid content amount of the coloring composition for decoration.

In addition, the mass ratio between the compound having the structure represented by Formula 1 and the compound having the structure represented by Formula 2 in the coloring composition for decoration of the present invention is preferably 1:2 to 200, more preferably 1:3 to 150, and still more preferably 1:5 to 100 (the compound having the structure represented by Formula 1:the compound having the structure represented by Formula 2). When the mass ratio is in the above-described range, sufficient curing properties can be obtained, and a cured film having superior crack resistance can be obtained.

<Pigment>

The coloring composition for decoration of the present invention contains a pigment.

The pigment that is used in the present invention is not particularly limited, and examples thereof include a white pigment, a black pigment, and pigments of other colors.

The pigment is preferably a white pigment or a black pigment and more preferably a white pigment.

As the white pigment, it is possible to use the white pigments described in Paragraph "0015" or "0114" of JP2005-7765A.

Specifically, the white pigment is preferably titanium dioxide, zinc oxide, lithopone, light calcium carbonate, white carbon, aluminum oxide, aluminum hydroxide, or barium sulfate, more preferably titanium dioxide or zinc oxide, still more preferably titanium dioxide, particularly preferably a rutile-type or anatase-type titanium dioxide, and most preferably a rutile-type titanium dioxide.

On the surface of the pigment, particularly, titanium dioxide, a surface treatment such as a silica treatment, an alumina treatment, a titania treatment, a zirconia treatment, or an organic substance treatment may be carried out, and a surface-treated pigment may be jointly used. In such a case, it is possible to suppress the catalyst activity of the pigment, particularly, titanium dioxide and improve heat resistance, a fading treatment, and the like.

From the viewpoint of decreasing the b* value of a cured substance after a thermal treatment, the surface treatment on the surface of titanium dioxide is preferably an alumina treatment, a zirconia treatment, or a silica treatment, and it is particularly preferable to jointly use an alumina treatment and a zirconia treatment or an alumina treatment and a silica treatment.

Examples of the black pigment include carbon black, titanium black, titanium carbon, iron oxide, titanium oxide, graphite, and the like, and, among these, carbon black is preferred.

As the pigments of other colors, it is possible to use a variety of well-known inorganic pigments or organic pigments of the related art.

Examples of the inorganic pigment include metallic compounds represented by a metallic oxide, a metallic complex, or the like, and specific examples thereof include metallic oxides of iron, cobalt, aluminum, cadmium, lead, copper, titanium, magnesium, chromium, zinc, or antimony, complex oxides of the above-described metal, and the like.

Examples of the organic pigment include

C.I. Pigment Red 177, 224, 242, 254, 255

C.I. Pigment Yellow 138, 139, 150, 180, 185

C.I. Pigment Green 7, 36, 58

C.I. Pigment Blue 15:1, 15:3, 15:4, 15:6,

C.I. Pigment Violet 23.

In addition, when the above-described pigment of other colors is added to the white pigment, it is possible to adjust the color to a pastel color.

The pigment may be used singly, or two or more pigments may be jointly used.

The content of the pigment is preferably 1% to 90% by mass, 10% to 90% by mass, still more preferably 20% to 80% by mass, and particularly preferably 30% to 75% by mass of the total solid contents of the coloring composition for decoration.

In addition, the pigment may be added to the coloring composition for decoration as a pigment dispersion liquid.

The pigment dispersion liquid preferably includes the pigment, a dispersing agent described below, and at least one solvent selected from the group consisting of hydrocarbon-based solvents, ketone-based solvents, ester-based solvents, and alcohol-based solvents.

A method for preparing the pigment dispersion liquid is not particularly limited; however, during the dispersion of the pigment, it is preferable to use only the pigment, the dispersing agent, the solvent, and, selectively, a small amount of a dispersion binder. Particularly, during the dispersion of the pigment, additives such as an additional binder described below or a polymerization catalyst described below are preferably not added to the composition as materials of the pigment dispersion liquid from the viewpoint of preventing a dispersion step from being inhibited.

As the solvent that is used for the pigment dispersion liquid, it is preferable to use at least one solvent selected from the group consisting of hydrocarbon-based solvents, ketone-based solvents, ester-based solvents, and alcohol-based solvents.

The hydrocarbon-based solvent is preferably xylene, toluene, benzene, ethyl benzene, hexane, or the like.

The ketone-based solvent is preferably methyl ethyl ketone, methyl isopropyl ketone, methyl isobutyl ketone, cyclohexanone, acetone, diethyl ketone, or the like.

The ester-based solvent is preferably propylene glycol monomethyl ether acetate, ethyl acetate, butyl acetate, isobutyl acetate, isopropyl acetate, ethyl cellosove acetate, butyl cellosolve acetate, cyclohexyl acetate, or the like.

The alcohol-based solvent is preferably propylene glycol monomethyl ether, ethyl cellosolve, butyl cellosolve, normal propyl alcohol, butanol, or the like.

Among these, at least one solvent selected from the group consisting of the hydrocarbon-based solvents, the ester-based solvents, and the ketone-based solvents is preferred, and at least one solvent selected from the group consisting of xylene, methyl ethyl ketone, methyl isobutyl ketone, propylene glycol monomethyl ether acetate, isobutyl acetate, and ether acetate is particularly preferred.

The content of the solvent in the pigment dispersion liquid (with respect to the total of the total solid content and the solvent) is preferably 8% to 90% by mass, more preferably 10% to 70% by mass, and particularly preferably 12% to 50% by mass.

A disperser used to disperse the pigment is not particularly limited, and examples thereof include well-known dispersers such as kneaders, roll mills, attritors, super mills, dissolvers, homogenizers, sand mills, and beads mills which are described in p. 438 of "Pigment Dictionary", Kunizou Asakura, 1st edition, Asakura Publishing Co., Ltd., 2000. Furthermore, the pigment may be finely ground using a friction force by means of the mechanical grinding described in p. 310 of the same publication.

In the pigment, the average particle diameter of primary particles is preferably 0.005 to 0.5 μm, more preferably 0.16 to 0.4 μm, still more preferably 0.18 to 0.30 μm, and particularly preferably 0.19 to 0.27 μm from the viewpoint of dispersion stability and the covering power. When the average particle diameter is in the above-described range, the covering power is strong, the base of the light-blocking layer becomes almost invisible, the viscosity does not easily increase, the chromaticity is sufficiently high, and the state of surfaces coated with the pigment becomes favorable.

Meanwhile, the "average particle diameter of primary particles" mentioned herein refers to the diameter of a circle having the same area as the particle in an electron micrograph, and the "number-average particle diameter" refers to the average value of 100 particle diameters arbitrarily selected from the particle diameter of a number of particles.

In order to prevent the settlement and agglomeration of the pigment particles, a binder may be added to the pigment dispersion liquid. Examples of the binder include silicone resins from the viewpoint of thermal coloration.

The content of the binder with respect to the total solid content in the pigment dispersion liquid is preferably 0.1% to 30% by mass, more preferably 0.2% to 20% by mass, and particularly preferably 0.5% to 10% by mass.

In addition the content of a dispersing agent described below in the pigment dispersion liquid is preferably 0.2 to 25 parts by mass, more preferably 0.5 to 20 parts by mass, and still more preferably 1 to 15 parts by mass with respect to 100 parts by mass of the inorganic pigment.

<Dispersing Agent>

The coloring composition for decoration of the present invention preferably includes a dispersing agent.

As the dispersing agent, it is possible to use a well-known dispersing agent, and the dispersing agent is preferably a polymer dispersant. Meanwhile, the "polymer dispersant" in the present invention refers to a dispersant having a weight-average molecular weight of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, DISPERBYK-182 (manufactured by BYK Chemi GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 (manufactured by EFKA Additive); DISPERSE AID 6, DISPERSE AID 8, DISPERSE AID 15, DISPERSE AID 9100 (manufactured by San Nopco Limited); a variety of SOLSPERSE dispersants such as SOLSPERSE 3000, 5000, 9000, 12000, 13240, 13940, 17000, 22000, 24000, 26000, 28000, 32000, 36000, 39000, 41000, 71000 (manufactured by Noveon); ADEKA PLURONIC L31, F38, L42, L44, L61, L64, F68, L72, P95, F77, P84, F87, P94, L101, P103, F108, L121, and P-123 (manufactured by Adeka Corporation), IONET S-20 (manufactured by Sanyo Chemical Industries, Ltd.), and DISPARLON KS-860, 873SN, and 874 (polymer dispersants), #2150 (aliphatic polyvalent carboxylic acid), #7004 (polyether ester type dispersant) (manufactured by Kusumoto Chemicals, Ltd.), and KP-578 (acrylic graft copolymer) (manufactured by Shin-Etsu Chemical Co., Ltd.).

Preferred examples of the dispersing agent that can be used in the present invention include dispersing agents represented by Formula 4 below. When a dispersing agent in the above-described range is used, it is possible to obtain a decorative material more rarely causing thermal coloration.

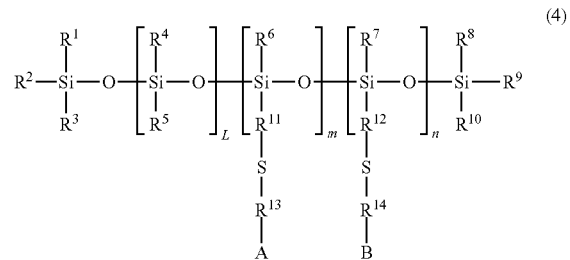

(4)

In Formula 4, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 5 below, L and n each independently represent an integer of 1 or more, and m represents an integer of 0 or more.

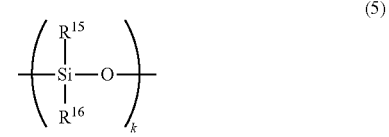

(5)

In Formula 5, $R^{15}$ and $R^{16}$ each independently represent a hydrogen atom, a hydroxy group, an aryl group, or an alkyl group having 1 to 3 carbon atoms, and k represents an integer of 1 or more.

In Formula 4, $R^1$ to $R^{10}$ each independently represent a hydrogen atom, a hydroxy group, an aryl group, or an alkyl group having 1 to 3 carbon atoms and are preferably an aryl group or an alkyl group having 1 to 3 carbon atoms and more preferably an alkyl group having 1 to 3 carbon atoms.

Examples of the aryl group as $R^1$ to $R^{10}$ include phenyl groups and substituted phenyl groups.

Examples of the alkyl group having 1 to 3 carbon atoms as $R^1$ to $R^{10}$ include a methyl group, an ethyl group, an n-propyl group, and an i-propyl group, a methyl group or an ethyl group is preferred, and a methyl group is more preferred.

$R^1$ to $R^{10}$ may further have a substituent. For example, in a case in which $R^1$ to $R^{10}$ represent a hydroxy group, $R^1$ to $R^{10}$ may further have an arbitrary alkyl group as a substituent and may form an alkoxy group. However, $R^1$ to $R^{10}$ preferably do not further have a substituent.

In a case in which L is 2 or more, two or more $R^4$'s and $R^5$'s may be identical to or different from each other.

In a case in which m is 2 or more, two or more $R^6$'s may be identical to or different from each other.

In a case in which n is 2 or more, two or more $R^7$'s may be identical to or different from each other.

In Formula 4, $R^{11}$ and $R^{12}$ each independently represent an arylene group or an alkylene group having 1 to 3 carbon atoms and are preferably an alkylene group having 1 to 3 carbon atoms.

In a case in which m is 2 or more, two or more $R^{11}$'s may be identical to or different from each other.

In a case in which n is 2 or more, two or more $R^{12}$'s may be identical to or different from each other.

In Formula 4, $R^{13}$ represents a single bond or a divalent organic linking group.

In a case in which m is 2 or more, two or more $R^{13}$'s may be identical to or different from each other.

In Formula 4, $R^{14}$ represents a single bond or a divalent organic linking group.

In a case in which n is 2 or more, two or more $R^{14}$'s may be identical to or different from each other.

Examples of the divalent organic linking group as $R^{13}$ or $R^{14}$ include groups made up of 1 to 100 carbon atoms, 0 to 10 nitrogen atoms, 0 to 50 oxygen atoms, 1 to 200 hydrogen atoms, and 0 to 20 sulfur atoms, and the divalent organic linking group may further have a substituent even when not substituted.

Specific examples of the divalent organic linking group as $R^{13}$ or $R^{14}$ include structural units selected from the following structural unit group and groups constituted of a combination of these structural units.

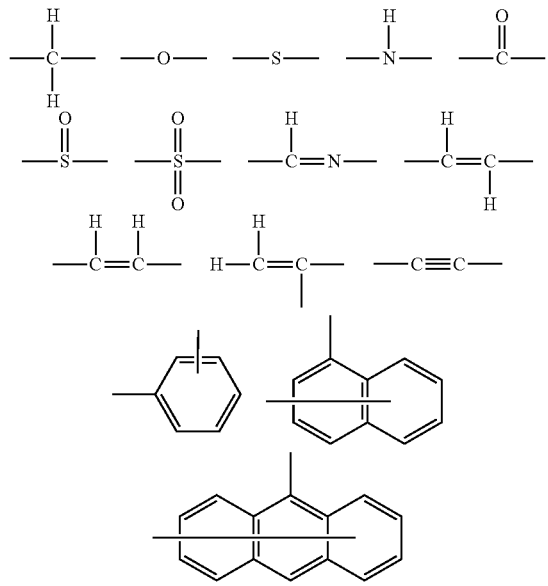

As $R^{13}$ or $R^{14}$, a single bond or a divalent organic linking group made up of 1 to 50 carbon atoms, 0 to 8 nitrogen atoms, 0 to 25 oxygen atoms, 1 to 100 hydrogen atoms, and 0 to 10 sulfur atoms is preferred, a single bond or a divalent organic linking group made up of 1 to 30 carbon atoms, 0 to 6 nitrogen atoms, 0 to 15 oxygen atoms, 1 to 50 hydrogen atoms, and 0 to 7 sulfur atoms is more preferred, and a single bond or a divalent organic linking group made up of 1 to 10 carbon atoms, 0 to 5 nitrogen atoms, 0 to 10 oxygen atoms, 1 to 30 hydrogen atoms, and 0 to 5 sulfur atoms is particularly preferred.

$R^{13}$ or $R^{14}$ is preferably a single bond or a divalent organic linking group which is constituted of a structural unit selected from the above-described structural unit group or a combination of these structural units and is made up of "1 to 10 carbon atoms, 0 to 5 nitrogen atoms, 0 to 10 oxygen atoms, 1 to 30 hydrogen atoms, and 0 to 5 sulfur atoms" (which may have a substituent, and the examples of the substituent include alkyl groups having 1 to 20 carbon atoms such as a methyl group and an ethyl group, aryl groups having 6 to 16 carbon atoms such as a phenyl group and a naphthyl group, acyloxy groups having 1 to 6 carbon atoms such as a hydroxyl group, an amino group, a carboxyl group, a sulfoneamido group, an N-sulfonyl amido group, and an acetoxy group, alkoxy groups having 1 to 6 carbon atoms such as a methoxy group and an ethoxy group, halogen atoms such as a chlorine atom and a bromine atom, alkoxycarbonyl groups having 2 to 7 carbon atoms such as a methoxycarbonyl group, an ethoxy carbonyl group, and a cyclohexyloxy carbonyl group, carbonic acid ester groups such as a cyano group and t-butylcarbonate, and the like).

$R^{13}$ is preferably a divalent organic linking group represented by —($CH_2$)—CH($R^{13A}$)—. $R^{13A}$ represents a hydrogen atom or an alkyl group having 1 to 3 carbon atoms and is preferably a hydrogen atom or a methyl group. $R^{13A}$ may further have a substituent, and, in a case in which $R^{13A}$ has a substituent, the substituent is preferably a carboxyl group.

$R^{14}$ is preferably a divalent organic linking group represented by —($CH_2$)—CH($R^{14A}$)—C(=O)—O—($C_qH_{2q}$)—. $R^{14A}$ represents a hydrogen atom or an alkyl group having 1 to 3 carbon atoms and is preferably a hydrogen atom or a methyl group. $R^{14A}$ may further have a substituent. q represents an integer of 0 or more and is preferably an integer of 1 or more.

In Formula 4, A represents a group having a pigment adsorption site.

In a case in which m is 2 or more, two or more A's may be identical to or different from each other.

A may have one pigment adsorption site or may have a plurality of pigment adsorption sites. In a case in which A has a plurality of pigment adsorption sites, the pigment adsorption sites may be identical to or different from each other.

A is, for example, preferably a monovalent organic group formed by combining a pigment adsorption site and an organic linking group constituted of 1 to 200 carbon atoms, 0 to 20 nitrogen atoms, 0 to 100 oxygen atoms, 1 to 400 hydrogen atoms, and 0 to 40 sulfur atoms. In a case in which the pigment adsorption site constitutes a monovalent organic group, the pigment adsorption site may be an organic group represented by A.

The pigment adsorption site preferably includes at least one site selected from the group consisting of acidic groups, groups having a basic nitrogen atom, an urea group, a urethane group, groups having a coordinating oxygen atom, a hydrocarbon group having 4 or more carbon atoms, heterocyclic residues, an amido group, an alkoxysilyl group, an epoxy group, an isocyanate group, a hydroxy group, and a thiol group, more preferably includes at least one site selected from the group consisting of acidic groups, groups having a basic nitrogen atom, an urea group, groups having a coordinating oxygen atom, heterocyclic residues, an amido group, an alkoxysilyl group, a hydroxy group, and a thiol group, particularly preferably includes at least one site selected from the group consisting of acidic groups and an alkoxysilyl group, and is more particularly preferably a carboxylic acid group, a phosphoric acid group, or a trimethoxysilyl group.

Preferred examples of the acidic group in the pigment adsorption site include a carboxylic acid group, a sulfonic acid group, a monosulfuric acid ester group, a phosphoric acid group (a phosphono group or the like), a phosphonooxy group, a monophosphoric ester group, and a boric acid group, more preferred examples thereof include a carboxylic acid group, a sulfonic acid group, a monosulfuric acid ester group, a phosphoric acid group, a phosphonooxy group, and a monophosphoric ester group, and particularly preferred examples thereof include a carboxylic acid group, a sulfonic acid group, and a phosphoric acid group.

Examples of the group having a basic nitrogen atom in the pigment adsorption site include an amino group ($-NH_2$), a substituted imino group ($-NHR^{C1}$, $-NR^{C2}R^{C3}$, here, $R^{C1}$, $R^{C2}$, and $R^{C3}$ each independently represent an alkyl group having 1 to 20 carbon atoms, an aryl group having 6 or more carbon atoms, or an aralkyl group having 7 or more carbon atoms), a guanidyl group, an amidinyl group, and the like.

Examples of the urea group in the pigment adsorption site include $-NR^{C4}CONR^{C5}R^{C6}$ (here, $R^{C4}$ to $R^{C6}$ each independently represent a hydrogen atom, an alkyl group having 1 to 20 carbon atoms, an aryl group having 6 or more carbon atoms, or an aralkyl group having 7 or more carbon atoms), $-NR^{C4}CONHR^{C6}$ (here, $R^{C4}$ and $R^{C6}$ each independently represent a hydrogen atom, an alkyl group having 1 to 10 carbon atoms, an aryl group having 6 or more carbon atoms, or an aralkyl group having 7 or more carbon atoms) is more preferred, and $-NHCONHR^{C6}$ (here, $R^{C6}$ represents a hydrogen atom, an alkyl group having 1 to 10 carbon atoms, an aryl group having 6 or more carbon atoms, or an aralkyl group having 7 or more carbon atoms) is particularly preferred.

Examples of the urethane group in the pigment adsorption site include $-NHCOOR^{C7}$, $-NR^{C8}COOR^{C9}$, $-OCONHR^{C10}$, $-OCONR^{C11}R^{C12}$ (here, $R^{C7}$ to $R^{C12}$ each independently represent an alkyl group having 1 to 20 carbon atoms, an aryl group having 6 or more carbon atoms, or an aralkyl group having 7 or more carbon atoms), $-NHCOOR^{C7}$ or $-OCONHR^{C10}$ (here, $R^{C7}$ and $R^{C10}$ each independently represent an alkyl group having 1 to 20 carbon atoms, an aryl group having 6 or more carbon atoms, or an aralkyl group having 7 or more carbon atoms) is more preferred, and $-NHCOOR^{C7}$ or $-OCONHR^{C10}$ (here, $R^{C7}$ and $R^{C10}$ each independently represent an alkyl group having 1 to 10 carbon atoms, an aryl group having 6 or more carbon atoms, or an aralkyl group having 7 or more carbon atoms) is particularly preferred.

Examples of the group having a coordinating oxygen atom in the pigment adsorption site include an acetylacetonate group, crown ethers, and the like.

Examples of the hydrocarbon group having 4 or more carbon atoms in the pigment adsorption site include an alkyl group having 4 or more carbon atoms, an aryl group having 6 or more carbon atoms, an aralkyl group having 7 or more carbon atoms, and the like, an alkyl group having 4 to 20 carbon atoms, an aryl group having 6 to 20 carbon atoms, or an aralkyl group having 7 to 20 carbon atoms is more preferred, and an alkyl group having 4 to 15 carbon atoms (for example, an octyl group, a dodecyl group, or the like), an aryl group having 6 to 15 carbon atoms (for example, a phenyl group, a naphthyl group, or the like), or an aralkyl group having 7 to 15 carbon atoms (for example, a benzyl group or the like) is particularly preferred.

Examples of the heterocyclic residue in the pigment adsorption site include residues having a heterocycle selected from the group consisting of thiophene, furan, xanthene, pyrrole, pyrrolidone, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, and anthraquinone.

Examples of the amido group in the pigment adsorption site include $-CONHR^{C13}$ (here, $R^{C13}$ represents an alkyl group having 1 to 20 carbon atoms, an aryl group having 6 or more carbon atoms, or an aralkyl group having 7 or more carbon atoms) and the like.

Examples of the alkoxysilyl group in the pigment adsorption site include a trimethoxysilyl group, a triethoxysilyl group, and the like.

Examples of aspect that the organic group having the pigment adsorption site is capable of employ include the aspects described in Paragraphs "0016" to "0046" of JP2013-43962A, and Paragraphs "0016" to "0046" of JP2013-43962A are incorporated into the present invention.

In Formula 4, B represents a group having a structure represented by Formula 5.

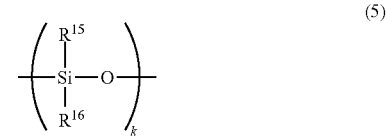

In Formula 5, $R^{15}$ and $R^{16}$ each independently represent a hydrogen atom, a hydroxy group, an aryl group, or an alkyl group having 1 to 3 carbon atoms, and k represents an integer of 1 or more.

$R^{15}$ and $R^{16}$ each independently are preferably an alkyl group having 1 to 3 carbon atoms, more preferably a methyl group or an ethyl group, and particularly preferably a methyl group.

k represents an integer of 1 or more and is preferably an integer of 2 to 300 and more preferably an integer of 10 to 200.

The structure represented by Formula 5 is preferably a structure derived from a silicone-based monomer. B alone may be a structure derived from a silicone-based monomer, and a combination of B and $R^{14}$ may be a structure derived from a silicone-based monomer. The silicone-based monomer may be a silicone-based macromer. Meanwhile, in the present specification, "macromer (also referred to as macromonomer)" is a collective term of oligomers (having a degree of polymerization of approximately 2 to 300) or polymers having a polymerizable functional group and has properties as both a high molecule and a monomer. The structure represented by Formula 5 is a structure derived from a silicone-based macromer having a weight-average molecular weight of 1,000 to 50,000 (more preferably 1,000 to 10,000 and still more preferably 1,000 to 5,000).

Furthermore, the dispersing agent represented by Formula 4 is preferably soluble in organic solvents. When the dispersing agent has a high affinity to organic solvents, for example, in a case in which the dispersing agent is used as a dispersant, the affinity to dispersion media becomes strong, and adsorption layers sufficiently contributing to dispersion stabilization are easily ensured.

In addition, in Formulae 4 and 5, $R^1$ to $R^{10}$ each independently are a hydrogen atom, a methyl group, or a phenyl group, and $R^{15}$ and $R^{16}$ each independently are a hydrogen atom, a hydroxy group, a methyl group, or a phenyl group.

Examples of groups having the structure represented by Formula 5 include groups derived from X-22-174ASX, X-22-174BX, KF-2012, X-22-173BX, or X-22-3710 which are Shin-Etsu Chemical Co., Ltd.

In Formula 4, L represents an integer of 1 or more and is preferably an integer of 1 to 100, more preferably an integer of 1 to 60, and particularly preferably an integer of 1 to 30.

In Formula 4, m represents an integer of 0 or more and is preferably an integer of 1 or more, more preferably an integer of 1 to 60, and particularly preferably an integer of 1 to 30 from the viewpoint of enhancing the dispersibility of the pigment.

In Formula 4, n represents an integer of 1 or more and is preferably an integer of 1 to 100, more preferably an integer of 1 to 60, and particularly preferably an integer of 1 to 30.

The proportions of the contents of the respective partial structures in the dispersing agent represented by Formula 4 are not particularly limited. That is, in Formula 4, the proportions of L, m, and n are not particularly limited.

In addition, the order of the respective partial structures (structures in individual parentheses having a subscript of L, m, or n on the right side or a repeating unit represented by Formula 6 described below) in the dispersing agent represented by Formula 4 is not particularly limited, the individual partial structures may be bonded to each other in an arbitrary order and, for example, may be bonded to each other in a block or may be randomly bonded to each other.

For the pigment dispersion liquid in the present invention, m in Formula 4 preferably represents an integer of 1 or more.

The dispersing agent represented by Formula 4 may have repeating units other than L, m, n, and k repeating units, but preferably does not have such repeating units.

Examples of the other repeating units include repeating units having a pigment adsorption site other than A. For example, the dispersing agent represented by Formula 4 may have a repeating unit having a (unreacted) thiol group represented by Formula 6 below.

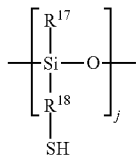

(6)

In Formula 6, $R^{17}$ and $R^{18}$ each independently represent a hydrogen atom, a hydroxy group, an aryl group, or an alkyl group having 1 to 3 carbon atoms, and j represents an integer of 0 or more.

In Formula 6, preferred aspect of $R^{17}$ and $R^{18}$ are identical to the preferred aspect of $R^6$ and $R^{11}$ in Formula 4.

j is preferably 0.

Examples of a polymer including the repeating unit having a thiol group represented by Formula 6 include KF-2001, KF-2004, and the like which are manufactured by Shin-Etsu Chemical Co., Ltd.

The weight-average molecular weight of the dispersing agent is preferably 1,000 to 5,000,000, more preferably 2,000 to 3,000,000, and particularly preferably 2,500 to 3,000,000. When the weight-average molecular weight is 1,000 or more, the film-producing properties becomes favorable.

The dispersing agent may be used singly or two or more dispersing agents may be jointly used.

The content of the dispersing agent in the coloring composition for decoration of the present invention is preferably 0.2 to 100 parts by mass, more preferably 0.5 to 60 parts by mass, and still more preferably 1 to 40 parts by mass with respect to 100 parts by mass of the pigment.

In addition, in the composition for decoration of the present invention, the total content of the compound having the structure represented by Formula 1, the compound having the structure represented by Formula 2, the pigment, the dispersing agent represented by Formula 4, and a platinum compound described below is preferably 50% by mass or more, more preferably 80% by mass or more, still more preferably 85% by mass or more, and particularly preferably 90% by mass or more of the total solid content amount of the coloring composition for decoration of the present invention. When the total content is in the above-described range, the crack resistance of a cured substance to be obtained is superior, the thermal coloration of the cured substance due to heat is less caused, and the wear resistance of the cured substance is superior.

<Platinum Compound>

The coloring composition for decoration of the present invention preferably includes a platinum compound. It is assumed that, when the coloring composition includes a platinum compound, the hydrosilylation reaction between the compound having the structure represented by Formula 1 and the compound having the structure represented by Formula 2 proceeds more easily, and it is possible to obtain a decorative material which has superior crack resistance during heating and more rarely causes thermal coloration.

Examples of the platinum compound include well-known platinum-based catalysts, and specific examples thereof include chloroplatinic acids such as chloroplatinic acid (I) and chloroplatinic acid (II), alcohol compounds or aldehyde compounds of chloroplatinic acid, chain salts of chloroplatinic acid and a variety of olefins, and the like.

The platinum compound may be used singly or two or more platinum compounds may be jointly used.

The composition of the platinum compound in the coloring composition for decoration of the present invention is preferably 0.0001% to 5% by mass, more preferably 0.001% to 2% by mass, and still more preferably 0.01% to 1% by mass of the total solid content in the coloring composition for decoration.

<Solvent>

The coloring composition for decoration of the present invention may include a solvent.

The solvent is not particularly limited, and it is possible to use well-known solvents. Among these, at least one solvent selected from the group consisting of the hydrocarbon-based solvents, the ketone-based solvents, the ester-based solvents, and the alcohol-based solvents, which have been described above, is preferred, at least one solvent selected from the group consisting of the hydrocarbon-based solvents and the ketone-based solvents is more preferred, and at least one solvent selected from the group consisting of aromatic hydrocarbon-based solvents and the ketone-based solvents is still more preferred.

The solvent may be used singly or two or more solvents may be jointly used.

The content of the solvent in the coloring composition for decoration of the present invention is not particularly limited, but is preferably 1% to 90% by mass, more preferably 10% to 90% by mass, and still more preferably 20% to 80% by mass of the total mass of the coloring composition for decoration.

<Other Additives>

The coloring composition for decoration of the present invention may include additives other than what has been described above.

The other additives are not particularly limited, well-known additives can be used, and it is possible to use, for example, a coating aid, an antioxidant, a polymerization inhibitor, and the like.

(Decorative Material)

A decorative material of the present invention is a decorative material formed of the coloring composition for decoration of the present invention and is preferably a decorative material formed by curing the coloring composition for decoration of the present invention.

In addition, in a case in which the coloring composition for decoration of the present invention includes a solvent, the coloring composition for decoration is preferably cured by removing the solvent.

The decorative material of the present invention is preferably for touch panels.

In addition, the decorative material of the present invention is preferably a white decorative material. Meanwhile, the decorative material of the present invention may be a black decorative material or a color decorative material. The black decorative material may be used as a light-blocking layer for touch panels described below.

The decorative material of the present invention is for touch panels and is particularly preferably a white decorative material.

The thickness of the decorative material of the present invention is preferably 10 to 40 μm, more preferably 15 to 40 μm, and still more preferably 20 to 38 μm from the viewpoint of enhancing the covering power.

The optical density (also referred to as OD) of the decorative material of the present invention is preferably 0.5 or higher and more preferably 1.0 or higher from the viewpoint of enhancing the covering power.

(Base Material Having Decorative Material)

A base material having a decorative material of the present invention has the decorative material of the present invention and a base material.

The base material having a decorative material of the present invention preferably further has a light-blocking layer.

In addition, the base material having a decorative material of the present invention preferably further has a conductive layer.

The base material having a decorative material of the present invention is more preferably a base material having a decorative material which has a base material, the decorative material of the present invention, a light-blocking layer, and a conductive layer in this order.

It is preferable that the base material having a decorative material is a base material having a decorative material which has a base material, the decorative material, a light-blocking layer, and a conductive layer in this order, the base material having a decorative material has a translucent region that transmits light in the thickness direction, the decorative material (and the light-blocking layer which may be arbitrarily provided) is laminated on the base material so as to surround the translucent region, and an inclined portion formed so that the thickness of the decorative material decreases toward the inside of the translucent region is provided in the inner edge of the decorative material. The inclination angle formed between the inclined portion surface and the base material surface is more preferably 10 to 60 degrees. When the decorative material has the inclined portion and the inclination angle formed between the inclined portion surface and the base material surface is 10 to 60 degrees, the level difference in the film thickness between the decorative material and a place in the base material in which the decorative material is not formed decreases, and the conductive layer on the decorative material (or the light-blocking layer in a case in which the light-blocking layer is provided on the decorative material) does not easily cause a problem of disconnection or the like.

Hereinafter, a preferred aspect of the base material having a decorative material of the present invention will be described.

The base material having a decorative material of the present invention may have a single layer of the decorative material of the present invention or may have two or more layers of the decorative material of the present invention. Examples thereof include a laminate of a white decorative material and a black decorative material (the light-blocking layer).

The base material having a decorative material of the present invention is preferably provided with a constitution in which the decorative material and the light-blocking layer are provided in this order from the base material (film or glass) side since light leakage or the like is prevented.

In the base material having a decorative material of the present invention, the optical density of the base material having a decorative material is preferably 3.5 to 6.0, more preferably 4.0 to 5.5, and particularly preferably 4.5 to 5.0 in a region in which the decorative material is formed.

In a case in which the base material having a decorative material of the present invention includes a white decorative material on the base material side as the decorative material, regarding the tint of the base material having a decorative material on the base material side, in the SCI index, the L* value is preferably 85 or higher, more preferably 86 or higher, still more preferably 87 or higher, and particularly preferably 88 or higher in the region in which the decorative material is formed. Furthermore, in the base material having a decorative material of the present invention, in the SCI index, the L* value of the base material having a decorative material on the base material side after a high-temperature treatment at 280° C. for 40 minutes is preferably in the above-described range since the tint after the deposition of the conductive layer on the light-blocking layer by means of sputtering improves.

In a case in which the base material having a decorative material of the present invention includes a white decorative material on the base material side as the decorative material, regarding the tint of the base material having a decorative material on the base material side, in the SCI index, the b* value is preferably less than 1.0, more preferably 0.5 to 1.0, still more preferably −0.1 to 0.5, and particularly preferably −0.1 or less in the region in which the decorative material is formed. Furthermore, in the base material having a decorative material of the present invention, in the SCI index, the b* value of the base material having a decorative material on the base material side after a high-temperature treatment at 280° C. for 40 minutes is preferably in the above-described range since the tint after the deposition of the conductive layer on the light-blocking layer by means of sputtering improves.

Figure 2:
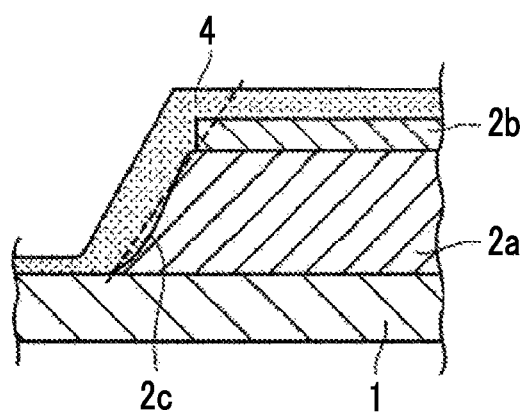
FIG. 2 is a partial enlarged cross-sectional view illustrating another example of the decorative material.
Figure 3:
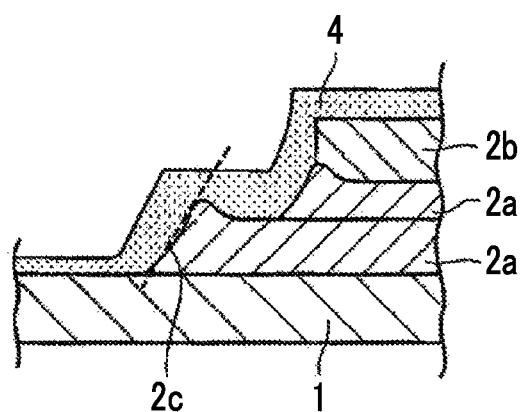
FIG. 3 is a partial enlarged cross-sectional view illustrating still another example of the decorative material.

A preferred embodiment of the decorative material of the present invention is a frame-like pattern around the translucent region (display region) formed on the non-contact side of the front plate of touch panels, and this frame-like pattern is formed in order to prevent routing circuits and the like from being visible or in order for decoration. As illustrated in the example of FIGS. 1 to 3, an inclined portion 2c formed so that the thickness of the decorative material decreases toward the inside of the translucent region is preferably provided in the inner edge of the decorative material that is a laminate of a decorative material 2a and a light-blocking layer 2b which are provided on a film material 1 as the base material. A conductive layer 6 is preferably formed on the decorative material and extends to the film material 1 along the inclined portion 2c of the decorative material.

When the inclined portion 2c is provided, the level difference in the film thickness between the decorative material and a place in the film material 1 in which the decorative material is not formed decreases, and a problem of disconnection or the like of the conductive layer 6 is not easily caused.

The method for forming the inclined portion 2c is not particularly limited, and examples thereof include a method in which the inclined portion is formed by shrinking the light-blocking layer 2b by means of heating, a method in which the inclined portion is formed by melting by means of heating a layer obtained by heating and curing the coloring composition for decoration of the present invention (also referred to as "cured layer") or a layer obtained by drying the coloring composition for decoration of the present invention (hereinafter, also referred to as "non-cured layer"), and the like.

The shape of the inclined portion 2c in the decorative material is not particularly limited, and, for example, the inclined portion may have a protuberant protrusion portion as illustrated in the example of FIGS. 1 and 3 or may have a shape connected in a smooth curve as illustrated in the example of FIG. 2. In addition, as illustrated in FIGS. 1 to 3, in the inclined portion 2c, the thickness of the decorative material 2a needs to decrease toward the inside of the translucent region. Meanwhile, the thickness of the light-blocking layer 2b may also decrease toward the inside of the translucent region together with the thickness of the decorative material 2a. As illustrated in the example of FIG. 3, the decorative material may be an aspect in which two or more layers of the decorative material 2a are laminated.

Figure 4:
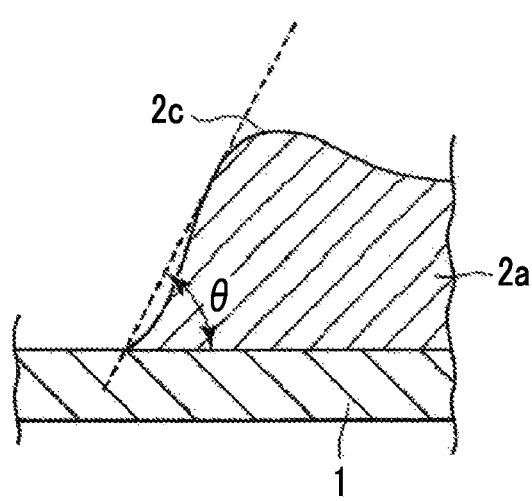
FIG. 4 is a partial enlarged cross-sectional view illustrating an inclination angle formed between an inclined portion and a base material.

The inclination angle θ formed between the inclined portion 2c surface and the film material 1 surface illustrated in FIG. 4 is 10 to 60 degrees and more preferably 15 to 55 degrees. When the inclination angle θ is 10 or more degrees, the area of a place in which the light-blocking layer 2b is not provided on the decorative material 2a decreases. Therefore, the area of abnormal appearance, that is, a region with a low optical density decreases, and the frequency of light leakage from display devices or circuits being visible decreases. On the other hand, when the inclination angle θ is 60 or less degrees, the frequency of the conductive layer causing a problem of disconnection or the like decreases.

As illustrated using dotted lines in FIGS. 1 to 4, the inclination angle θ refers to an inclination angle formed between a plane obtained by approximating the surface of the inclined portion 2c and the film material 1 surface. The inclination angle θ can be obtained by cutting the film material 1 and measuring the angle formed by a slope from the substrate using an optical microscope in the cross-sectional direction.

The inclination angle θ is preferably provided so that the difference between the width of the decorative material 2a on the film material 1 side and the width of the light-blocking layer 2b reaches 200 µm or less. When the above-described constitution is provided, abnormal appearance and a problem such as the disconnection of the conductive layer 6 can be eliminated.

The difference between the width of the decorative material 2a on the film material 1 side and the width of the light-blocking layer 2b (the difference of an edge) is preferably 200 µm or less, more preferably 5 to 100 µm, and still more preferably 10 to 90 µm.

The width of the decorative material 2a on the film material 1 side refers to the width of, out of the decorative material 2a, the decorative material 2a on a side at which the decorative material is in contact with the film material 1.

Meanwhile, in the above-description, the film material 1 is used as the base material; however, instead, cover glass may be used.

<Base Material>

As the base material that is used for the base material having a decorative material of the present invention, a variety of base materials can be used, but a film material (film base material) made of a film is preferred, and a base material which is not optically distorted or is highly transparent is more preferred. The base material in the base material having a decorative material of the present invention preferably has a full light transmittance of 80% or more.

Examples of a specific material for the film material include polyethylene terephthalate (PET), polyethylene naphthalate, polycarbonate (PC), triacetyl cellulose (TAC), and cycloolefin polymers (COP).

In addition, the base material may be glass or the like.

In the base material having a decorative material of the present invention, the base material is preferably a base material of a material selected from the group consisting of glass, TAC, PET, PC, and COP and more preferably a base material made of glass or a cycloolefin polymer.

In addition, to the base material surface, a variety of functions may be added. Specific examples thereof include an antireflection layer, an antiglare layer, a phase difference layer, a view angle-improving layer, a protective layer, a self-repairing layer, an antistatic layer, an anti-fouling layer, an anti-electromagnetic wave layer, and a conductive layer.

In the base material having a decorative material of the present invention, the base material preferably has a conductive layer on the base material surface. Preferred examples of the conductive layer include those described in JP2009-505358A.

In addition, the base material preferably further has at least one of an anti-damage layer or an antiglare layer.

The film thickness of the base material in the base material having a decorative material of the present invention is preferably 35 to 200 µm, more preferably 40 to 150 µm, and particularly preferably 40 to 100 µm.

In addition, in a case in which the decorative material is used for transfer materials, it is possible to carry out a surface treatment on the non-contact surface of the base material (the front plate) in advance in order to enhance the adhesiveness of the decorative material. As the surface treatment, a surface treatment using a silane compound (silane coupling treatment) is preferably carried out. The surface treatment using a silane compound is carried out by, for example, blowing a silane coupling liquid (an aqueous solution of 0.3% by mass of N-β-(aminoethyl)γ-aminopropyltrimethoxysilane, trade name: KBM603, manufactured by Shin-Etsu Chemical Co., Ltd.) to the surface for 20 seconds by means of showering, washing the surface with pure water by means of showering, and causing a reaction by means of heating. A heating tank may be used, and a reaction can be accelerated by means of the preliminary heating of the base material using a laminator.

<Light-blocking Layer>

In a case in which the base material having a decorative material of the present invention includes a white decorative material on the base material side as the decorative material, the white decorative material preferably includes a light-blocking layer on a surface opposite to the base material.

In addition, the light-blocking layer preferably includes a pigment.

The light-blocking layer preferably includes a silicone resin having a siloxane bond in the main chain and, among silicone resins, preferably includes a methyl silicone resin. In addition, as the silicone resin having a siloxane bond in the main chain, the dispersing agent represented by Formula 4 may be used. However, in the base material having a decorative material of the present invention, the light-blocking layer may include other binder resins within the scope of the present invention.

Components which are other than the compound having the structure represented by Formula 1, the compound having the structure represented by Formula 2, and the pigment and can be used for the light-blocking layer are respectively the same as the components that can be used for the coloring composition for decoration of the present invention.

The proportion of the silicone resin in components other than the pigment which are included in the light-blocking layer is preferably 60% by mass or more and more preferably 70% by mass or more.

Furthermore, in the base material having a decorative material of the present invention, it is preferable that the total content of the compound having the structure represented by Formula 1, the compound having the structure represented by Formula 2, and the dispersing agent represented by Formula 4 is 90% by mass or more of the components other than the pigment which are included in the white decorative material and the total content of the compound having the structure represented by Formula 1, the compound having the structure represented by Formula 2, and the dispersing agent represented by Formula 4 is 70% by mass or more of the components other than the pigment which are included in the light-blocking layer.

A colorant for the light-blocking layer is preferably a pigment and more preferably a black pigment.

Examples of the black pigment include carbon black, titanium black, titanium carbon, iron oxide, titanium oxide, graphite, and the like, and, in the base material having a decorative material of the present invention, the light-blocking layer preferably includes at least one of titanium oxide or carbon black and more preferably include carbon black.

The film thickness of the light-blocking layer in the base material having a decorative material of the present invention is preferably 1.0 to 5.0 μm, more preferably 1.0 to 4.0 μm, and still more preferably 1.5 to 3.0 μm from the viewpoint of enhancing the covering power of the light-blocking layer.

The optical density (OD) of the light-blocking layer is preferably 3.5 or more and particularly preferably 4.0 or more from the viewpoint of enhancing the covering power of the light-blocking layer.

The surface electrical resistance of the light-blocking layer is preferably $1.0 \times 10^{10}$ Ω/□ or more, more preferably $1.0 \times 10^{11}$ Ω/□ or more, still more preferably $1.0 \times 10^{12}$ Ω/□ or more, and particularly preferably $1.0 \times 10^{13}$ Ω/□ or more. Meanwhile, the unit "Ω/□" refers to ohm per square meter.

<Conductive Layer>

The base material having a decorative material of the present invention preferably further has a conductive layer on the light-blocking layer.

As the conductive layer, it is possible to use those described in JP2009-505358A. In addition, the constitution or shape of the conductive layer will be described in the description of a first transparent electrode pattern, a second transparent electrode pattern, and other conductive elements in the description of a touch panel of the present invention described below.

In the base material having a decorative material of the present invention, the conductive layer preferably includes indium (including indium-containing compounds such as indium tin oxide (ITO) or indium alloys).

In the base material having a decorative material of the present invention, since the decorative material of the present invention has favorable crack resistance, even in a case in which the conductive layer is deposited by means of sputtering, the film properties of the decorative material can be improved, and, in a case in which the decorative material is a white decorative material, the b* value of the decorative material can be decreased.

<Method for Manufacturing Base Material Having Decorative Material>

The method for manufacturing the base material having a decorative material of the present invention is not particularly limited, but the layer obtained by heating and curing the coloring composition for decoration of the present invention (the cured layer) or the layer obtained by drying the coloring composition for decoration of the present invention (the non-cured layer) is preferably produced using a method selected from the group consisting of film transferring, thermal transfer printing, screen printing, and ink jet printing and more preferably produced by means of film transferring.

In addition, even in a case in which the light-blocking layer is formed, the light-blocking layer is preferably produced in the same manner.

Specifically, preferred examples of the method for manufacturing the base material having a decorative material include the following methods. Specifically, the base material having a decorative material is preferably produced using a method selected from the group consisting of (1) a method in which a step of laminating the non-cured layer and the light-blocking layer on the base material in this order is provided and the non-cured layer and the light-blocking layer are respectively produced by transferring at least one of a colored layer or the light-blocking layer onto a temporary support from a film transfer material including at least one of the non-cured layer or the light-blocking layer and then eliminating the temporary support (film transferring), (2) thermal transfer printing in which the temporary support side of a thermal transfer material including at least one of the non-cured layer or the light-blocking layer on a temporary support is heated and at least one of the non-cured layer or the light-blocking layer is transferred from the temporary support, (3) the screen printing of the coloring composition for decoration of the present invention or a composition for forming the light-blocking layer, and (4) the ink jet printing of the coloring composition for decoration of the present invention or a composition for forming the light-blocking layer. In addition, the method preferably includes a step in which the decorative material is provided with a frame-like shape so as to surround the translucent region on the base material and an inclined portion is formed so that the thickness of the decorative material decreases toward the inside of the translucent region in the inner edge of the decorative material.

The non-cured layer and the light-blocking layer may be formed using a combination of a plurality of methods out of film transferring, thermal transfer printing, screen printing, and ink jet printing.

Furthermore, the method for manufacturing the base material having a decorative material is preferably a method in which the non-cured layer and the light-blocking layer are formed on the base material as described below. Specifically, the base material having a decorative material is preferably formed by transferring the light-blocking layer and the non-cured layer onto the base material from the film transfer material including the temporary support, the light-blocking layer, and the non-cured layer in this order and then eliminating the temporary support or by transferring the non-cured layer onto the base material from the film transfer material including the temporary support and the non-cured layer, eliminating the temporary support, transferring the light-blocking layer onto the non-cured layer from the film transfer material including the temporary support and the light-blocking layer, and then eliminating the temporary support.

(Transfer Material for Forming Decorative Material)
<Film Transferring: Film Transfer Material>

A transfer material for forming the decorative material of the present invention preferably includes the coloring composition for decoration of the present invention and has a cured layer or a non-cured layer on a temporary support.

The transfer material for forming the decorative material of the present invention is preferably a film transfer material.

Figure 5:
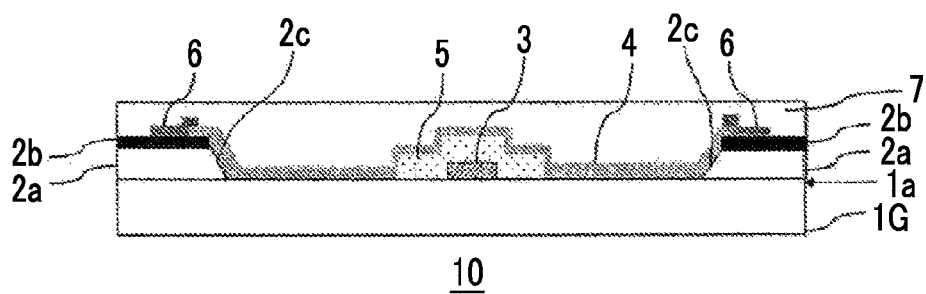
FIG. 5 is a schematic cross-sectional view illustrating the constitution of an example of a touch panel of the present invention for which a base material having a decorative material of the present invention is used.
Figure 7:
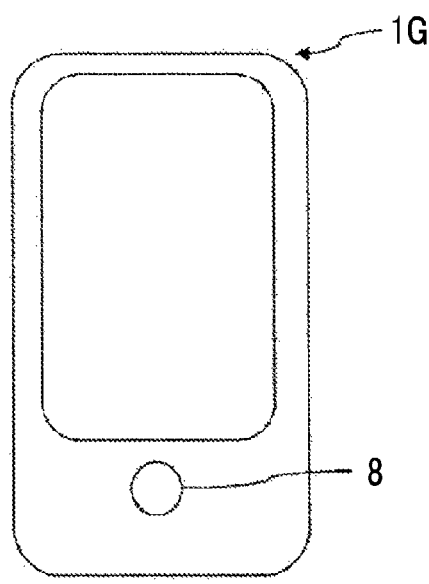
FIG. 7 is a view illustrating an example of the touch panel seen from an operation side.

In a touch panel having an opening portion 8 having the constitution of FIG. 7, when the non-cured layer (the decorative material 2a before heating), the light-blocking layer 2b, and the like illustrated in FIG. 5 are formed using the film transfer material, resist components do not leak through the opening portion even when cover glass 1G is used as the base material having the opening portion 8. Particularly, resist components do not protrude from the glass end in the decorative material 2a or the light-blocking layer 2b in which a light-blocking pattern needs to be formed almost to the boundary of the cover glass 1G, and thus the rear side of the cover glass 1G is not contaminated. Therefore, it becomes possible to manufacture touch panels having a merit of thin layers and weight reduction with simple steps.

The film transfer material preferably has a temporary support, the light-blocking layer, and a cured layer or a non-cured layer.

In addition, the light-blocking layer in the film transfer material may be a layer made of the coloring composition for decoration of the present invention or a layer obtained by drying the coloring composition for decoration of the present invention or a layer made of other compositions. Preferred examples of the composition of the light-blocking layer made of other compositions include the above-described composition of the light-blocking layer.

—Temporary Support—

The transfer material preferably has a temporary support.

The temporary support is preferably flexible and thus does not significantly deform, shrink, or extend even under pressurization or under pressurization and heating. Examples of the above-described temporary support include polyethylene terephthalate films, triacetate cellulose films, polystyrene films, polycarbonate films, and the like, and, among these, biaxially-stretched polyethylene terephthalate films are particularly preferred.

The thickness of the temporary support is not particularly limited, but is preferably 5 to 300 µm and more preferably 20 to 200 µm.

In addition, the temporary support may be transparent and may contain a silicon dye, an alumina sol, a chromium salt, a zirconium salt, or the like.

In addition, the temporary support can be imparted with conductive properties using the method or the like described in JP2005-221726A.

—Thermoplastic Resin Layer—

The transfer material may have at least one thermoplastic resin layer.

The thermoplastic resin layer is preferably provided between the temporary support and the non-cured layer. That is, the transfer material preferably includes the temporary support, the thermoplastic resin layer, and the non-cured layer in this order.

A component that is used for the thermoplastic resin layer is preferably an organic polymer substance described in JP1993-72724A (JP-H05-72724A) and is particularly preferably selected from organic polymer substances having a softening point of approximately 80° C. or lower measured using the Vicat method (specifically, a polymer softening point measurement method according to ASTM D1235).

Specific examples of the thermoplastic resin layer include organic high molecules such as polyolefins such as polyethylene and polypropylene, ethylene copolymers such as copolymers of ethylene and vinyl acetate or a saponified substance thereof and copolymers of ethylene and an acrylic acid ester or a saponified substance thereof, polyvinyl chloride, vinyl chloride copolymers such as copolymers of vinyl chloride and vinyl acetate or a saponified substance thereof, polyvinylidene chloride, vinylidene chloride copolymers, polystyrene, styrene copolymers such as copolymers of styrene and a (meth)acrylic acid ester or a saponified substance thereof, polypinyl toluene, vinyl toluene copolymers such as vinyl toluene and a (meth)acrylic acid ester or a saponified substance thereof, poly(meth)acrylic acid esters, (meth)acrylic acid ester copolymers such as copolymers of butyl (meth)acrylate and vinyl acetate, and polyamide resins such as vinyl acetate copolymer nylon, copolymerized nylon, N-alkoxymethylated nylon, and N-dimethylaminoated nylon.

The thickness of the thermoplastic resin layer is preferably 6 to 100 µm and more preferably 6 to 50 µm. When the thickness is in the above-described range, even in a case in which protrusions and recesses are present on the base material, the protrusions and the recesses can be sufficiently absorbed, and flatness is excellent.

—Interlayer—

The transfer material may have at least one interlayer in order to prevent components from being mixed together during the coating of a plurality of coated layers and during the storage after coating.

In a case in which the thermoplastic resin layer is provided between the temporary support and the non-cured layer, the interlayer is preferably provided between the thermoplastic resin layer and the non-cured layer. That is, the transfer material preferably includes the temporary support, the thermoplastic resin layer, the interlayer, and the non-cured layer in this order.

As the interlayer, an oxygen-shielding film having an oxygen-shielding function, which is described as "separation layer" in JP1993-72724A (JP-H05-72724A), is preferably used, and, in this case, the sensitivity increases during exposure, the time load of steppers decreases, and the productivity improves.

The oxygen-shielding film is preferably a film which exhibits poor oxygen-transmitting properties and is dispersed or dissolved in water or alkali aqueous solutions, and an oxygen-shielding film can be appropriately selected from well-known oxygen-shielding films. Among these, layers containing a polyvinyl alcohol and polyvinyl pyrrolidone are particularly preferred.

The thickness of the interlayer is preferably 0.1 to 5.0 µm and more preferably 0.5 to 2.0 µm. When the thickness is in the above-described range, the oxygen-shielding function does not degrade, and development or the removal of the interlayer does not take a long time.

—Protective Peeling Layer—

The transfer material is preferably provided with a protective peeling layer (also referred to as the cover film) so as to cover the non-cured layer in order to protect the transfer material from contamination or damages during storage. The protective peeling layer may be made of a material identical or similar to that of the temporary support and needs to be easily separated from the non-cured layer. The material for the protective peeling layer is appropriately, for example, silicone paper, a polyolefin or a polytetrafluoroethylene sheet.

The thickness of the protective peeling layer is preferably 1 to 100 µm, more preferably 5 to 50 µm, and particularly preferably 10 to 30 µm. When the thickness is 1 µm or more, the strength of the protective peeling layer is sufficient, and the protective peeling layer does not easily rupture, and, when the thickness is 100 µm or less, the price of the protective peeling layer does not excessively increase, and wrinkles are not easily generated during the lamination of the protective peeling layer.

Examples of the commercially available products of the protective peeling layer include AL FAN MA-410, E-200C, E-501 manufactured by Oji Paper Co., Ltd., polypropylene films manufactured by Shin-Etsu Chemical Co., Ltd., polyethylene terephthalate films such as PS series such as PS-25 manufactured by Teijin Limited., and the like, but are not limited thereto. In addition, the protective peeling layer can be easily manufactured by means of the sandblasting of a commercially available film.

As the protective peeling layer, it is possible to use a polyolefin film such as a polyethylene film. In addition, the polyolefin film that is used as the protective peeling layer is preferably manufactured by thermally melting, kneading, extruding, biaxially stretching, casting, or inflating raw materials.

<Method for Manufacturing Film Transfer Material>

The method for manufacturing the film transfer material is not particularly limited, and the film transfer material can be manufactured using, for example, the step described in Paragraphs "0064" to "0066" of JP2005-3861A. In addition, the film transfer material can also be produced using, for example, the method described in JP2009-116078A.

Examples of the method for manufacturing the film transfer material include a method including a step of forming layer by applying and drying the coloring composition for decoration of the present invention on the temporary support and a step of covering the formed layer with the protective peeling layer.

Here, the film transfer material that can be used in the present invention may include at least two layers of the non-cured layer and the light-blocking layer. Alternatively, it is also possible to transfer the film transfer material having the temporary support and the non-cured layer onto the base material, eliminate the temporary support, furthermore, transfer the film transfer material including at least the temporary support and the light-blocking layer onto the non-cured layer, and then eliminate the temporary support. In the former case, the transfer material of the present invention is a material having the non-cured layer and the light-blocking layer laminated in this order on the temporary support, and, in this case, it is possible to provide the decorative material and the light-blocking layer at the same time on the base material (preferably glass), which is preferable in terms of steps.

In the film transfer material that can be used in the present invention, other layers may be further formed within the scope of the gist of the present invention. In addition, before the formation of the non-cured layer, the thermoplastic resin layer and/or the interlayer (the oxygen-shielding layer) may be formed by means of coating.

As the method for applying the coloring composition for decoration of the present invention, a coating fluid for forming the thermoplastic resin layer, and a coating fluid for forming the interlayer onto the temporary support, it is possible to use a well-known coating method. For example, the film transfer material can be formed by applying and drying these coating fluids using a coater such as a spinner, a whirler, a roller coater, a curtain coater, a knife coater, a wire bar coater, or an extruder.

—Solvent—

The respective layers of the film transfer material can be preferably prepared using a solvent together with the respective components.

Examples of the solvent include esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, and ethyl ethoxyacetate, alkyl 3-oxypropionic acid alkyl esters such as methyl 3-oxypropionate and ethyl 3-oxypropionate (for example, methyl 3-methoxypropionate, ethyl 3-methoxypropionate, methyl 3-ethoxypropionate, and ethyl 3-ethoxypropionate), alkyl 2-oxypropionic acid alkyl esters such as methyl 2-oxypropionate, ethyl 2-oxypropionate and propyl 2-oxypropionate (for example, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxo-2-methylpropionate, methyl 2-methoxy-2-methylpropionate, ethyl 2-ethoxy-2-methylpropionate), methyl pyruvate, ethyl pyruvate, propyl pyruvate, methyl acetoacetate, ethyl acetoacetate, methyl 2-oxobutanoate, ethyl 2-oxobutanate, and the like;

ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether acetate, propylene glycol monoethyl ether acetate, propylene glycol propyl ether acetate, and the like;

ketones such as methyl ethyl ketone, methyl isobutyl ketone, xylene, cyclohexanone, 2-heptanone, 3-heptanone, and the like;

aromatic hydrocarbons such as toluene, xylene, and the like.

Among these, methyl ethyl ketone, methyl isobutyl ketone, cyclohexanone, propylene glycol monomethyl ether, propylene glycol monomethyl ether acetate, and the like are preferred.

The solvent may be used singly or a combination of two or more solvents may be used.

The method for covering the non-cured layer with the protective peeling layer is not particularly limited, and it is possible to use a method in which the protective peeling layer is superimposed and pressed on the non-cured layer on the temporary support.

In order to press the protective peeling layer, it is possible to use a well-known laminator such as a laminator, a vacuum laminator, or an auto-cut laminator.

As the pressing conditions, the atmosphere temperature is preferably 20° C. to 45° C., and the linear pressure is preferably 1,000 to 10,000 N/m.

—Transferring Method (Laminating Method)—

A transferring method (laminating method) is a method in which the transfer material for forming a decorative layer of the present invention is used, and a method including a transfer step of transferring the cured layer or the non-cured layer to at least the base material is preferred.

The non-cured layer is transferred (attached) to the base material surface by superimposing, pressurizing, and heating the non-cured layer on the base material surface. For the attachment, it is possible to use a well-known laminator described above.

Regarding the laminating method, since a desired penetrated non-cured layer is transferred to the base material, a single wafer processing-type highly accurate method in which the intrusion of air bubbles between the base material and the non-cured layer is prevented is preferred from the viewpoint of increasing the yield. Specific preferred examples thereof include the use of a vacuum laminator.

Examples of a device that is used as a (continuous-type/single wafer processing-type) laminator include V-SE340aaH manufactured by Climb Products and the like.

Examples of the vacuum laminator include laminators manufactured by Takano Seiki Co., Ltd., FVJ-540R and FV700 manufactured by Taisei Laminator Co., Ltd., and the like.

When a step of further laminating a support on a side of the temporary support opposite to the non-cured layer is provided before the attachment of the film transfer material to the base material, there are cases in which a preferred effect of preventing the intrusion of air bubbles during lamination can be obtained. The material for the support that is used in this case is not particularly limited, and examples thereof include polyethylene terephthalate, polycarbonate, triacetyl cellulose, and cycloolefin polymers.

In addition, the film thickness of the support is preferably in a range of 50 to 200 μm.

—Step of Eliminating Temporary Support—

The transfer method of the present invention preferably includes a step of eliminating the temporary support from the transfer material attached to the base material.

—Step of Removing Thermoplastic Resin Layer and Step or Removing Interlayer—

Furthermore, in a case in which the film transfer material includes the thermoplastic resin layer or the interlayer, the transfer method of the present invention preferably has a step of removing the thermoplastic resin layer and/or the interlayer.

The step of removing the thermoplastic resin layer and/or the interlayer can be carried out using an alkali developer that is generally used in photolithography.

The alkali developer is not particularly limited, and it is possible to use well-known developers such as those described in JP1993-72724A (JP-J05-72724A). Meanwhile, the developer is preferably a developer allowing decorative materials to perform dissolution-type development behaviors, and, for example, a developer including a compound having a pKa of 7 to 13 in a concentration of 0.05 to 5 mol/L is preferred, and furthermore, a small amount of an organic solvent which is miscible with water may be added to the developer.

Examples of the organic solvent which is miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methyl pyrrolidone, and the like. The concentration of the organic solvent is preferably 0.1% to 30% by mass.

In addition, it is possible to further add a well-known surfactant to the alkali developer. The concentration of the surfactant is preferably 0.01% to 10% by mass.

The method for the step of removing the thermoplastic resin layer and/or the interlayer may be any one of paddling, showering, showering and spinning, dipping, and the like. In the showering, the thermoplastic resin layer or the interlayer can be removed by blowing the developer to the layer by means of showering. In addition, it is preferable to blow a detergent or the like by means of showering and remove residue while scrubbing the non-cured layer with a brush or the like after development. The liquid temperature is preferably 20° C. to 40° C., and the pH is preferably 8 to 13.

—Post Baking Step—

The transfer method of the present invention preferably includes a post baking step after the transfer step and more preferably includes a step of post baking after the step of removing the thermoplastic resin layer and/or the interlayer. It is preferable to carry out post baking so as to cure the non-cured layer, thereby producing a decorative material.

In the post baking step, the non-cured layer and the light-blocking layer in the transfer material are preferably formed by being heated at 50° C. to 300° C. in an environment of 0.08 to 1.2 atmospheres from the viewpoint of satisfying both strength and productivity. Meanwhile, 1 atmosphere is equal to 0.101325 MPa.

Heating for the post baking is more preferably carried out in an environment of 0.5 or more atmospheres. On the other hand, the heating is more preferably carried out in an environment of 1.1 or less atmospheres and particularly preferably carried out in an environment of 1.0 atmosphere or less. Furthermore, the heating is more particularly preferably carried out in an environment of approximately 1 atmosphere (atmospheric pressure) since it is possible to reduce the manufacturing costs without using special decompression devices. Here, in a case in which the non-cured layer and the light-blocking layer are cured by means of heating, in the related art, the layers are heated in a decompressed environment of an extremely low pressure, and the oxygen concentration is decreases, thereby maintaining the strength after the baking, but the use of the film transfer material is capable of improving the tint (decreases the b* value) of the decorative material and the light-blocking layer on the base material side in the base material having a decorative material of the present invention even after the baking in the above-described pressure range and enhancing the whiteness.

The temperature for the post baking is preferably 50° C. to 300° C., more preferably 100° C. to 300° C., and still more preferably 120° C. to 300° C.

In addition, the post baking may be carried out at two or more different temperatures for a predetermined time respectively. For example, it is possible to, first, heat the non-cured layer at preferably 50° C. to 200° C. and more preferably 100° C. to 200° C. and then heat the non-cured layer at preferably 200° C. to 280° C. and more preferably 220° C. to 260° C.

The time of the post baking is more preferably 20 to 150 minutes and particularly preferably 30 to 100 minutes. In a case in which the post baking is carried out at two or more temperatures, the total time of the post baking carried out at the respective temperatures is preferably 20 to 150 minutes.

The post baking may be carried out in an air environment or in a nitrogen-substituted environment, but is particularly preferably carried out in an air environment since it is possible to reduce the manufacturing costs without using special decomposition devices.

—Other Steps—

The transfer method of the present invention may has steps other than the above-described steps.

Meanwhile, as examples of the development step, the step of removing the thermoplastic resin layer and/or the interlayer, and other steps, it is also possible to preferably use the methods described in Paragraphs "0035" to "0051" of JP2006-23696A in the present invention.

<Thermal Transfer Printing>

In thermal transfer printing, the non-cured layer and the light-blocking layer are formed by means of thermal transferring. For example, the non-cured layer is transferred from the temporary support by heating the temporary support side of a thermal transfer material including the non-cured layer on the temporary support. Next, the light-blocking layer is transferred onto the non-cured layer from the temporary support by heating the temporary support side of a thermal transfer material including the light-blocking layer on the temporary support. The non-cured layer in the thermal transfer material preferably includes the dispersing agent represented by Formula 4. Meanwhile, the thermal transferring is preferably carried out at a heating temperature and a heating time so that the non-cured layer is not fully cured.

As the method for the thermal transfer printing, ink ribbon printing is preferred. Examples of the method for ink ribbon printing which is used in the method for manufacturing the base material having a decorative material of the present invention include the methods described in "Nonimpact Printing—Techniques and Materials—(published by CMC Publishing Co., Ltd., Dec. 1, 1986)".

<Screen Printing>

In screen printing, the non-cured layer and/or the light-blocking layer are produced by means of the screen printing of the coloring composition for decoration of the present invention. The coloring composition for decoration of the present invention preferably includes the dispersing agent represented by Formula 4.

The method for the screen printing is not particularly limited, well-known methods can be used, and it is possible to use, for example, the method described in JP4021925B and the like. In addition, when screen printing is carried out a plurality of times, it is also possible to decrease the film thickness even with screen printing.

<Ink Jet Printing>

In ink jet printing, the non-cured layer and/or the light-blocking layer are respectively produced by means of the ink jet printing of the coloring composition for decoration of the present invention, and the coloring composition for decoration of the present invention preferably includes the dispersing agent represented by Formula 4. Examples of the method for the ink jet printing that is used in the method for manufacturing the base material having a decorative material of the present invention include the method described in "Electronics Application of Ink Jet Technologies" (published by REALIZE Science & Engineering, Sep. 29, 2006) and the like.

(Touch Panel)

A touch panel of the present invention has the decorative material of the present invention, a decorative material formed using the transfer material for forming the decorative material of the present invention, or the base material having a decorative material of the present invention.

The above-described touch panel is preferably an electrostatic capacitance-type input device.

<Electrostatic Capacitance-type Input Device and Image Display Device Including Electrostatic Capacitance-type Input Device as Constituent Element>

An electrostatic capacitance-type input device preferably has a front plate (base material) and at least the following requirements (1) to (4) on the non-contact side of the front plate and includes the base material having a decorative material of the present invention as a laminate of a front plate and the decorative material (1).

(1) Decorative material (2) A plurality of first transparent electrode patterns formed of a plurality of pad portions extending in a first direction through connection portions (3) A plurality of second transparent electrode patterns which are electrically insulated from the first transparent electrode patterns and are made up of a plurality of pad portions extending in a direction perpendicular to the first direction (4) An insulating layer that electrically insulates the first transparent electrode patterns and the second transparent electrode patterns In addition, in the electrostatic capacitance-type input device, the second transparent electrode patterns may be transparent electrode patterns.

Furthermore, the electrostatic capacitance-type input device may further have the following (5).

(5) A conductive element which is electrically connected to at least one of the first transparent electrode patterns or the second transparent electrode patterns and is other than the first transparent electrode patterns and the second transparent electrode patterns.

Furthermore, the electrostatic capacitance-type input device more preferably includes the front plate (base material), the decorative material (1), and the base material having a decorative material of the present invention as a laminate having at least one electrode pattern out of the (2), (3), and (5) described above as the conductive layer.

The decorative material (1) preferably further has a light-blocking layer.

<Constitution of Electrostatic Capacitance-type Input Device>

First, the constitution of the electrostatic capacitance-type input device will be described.

Figure 6:
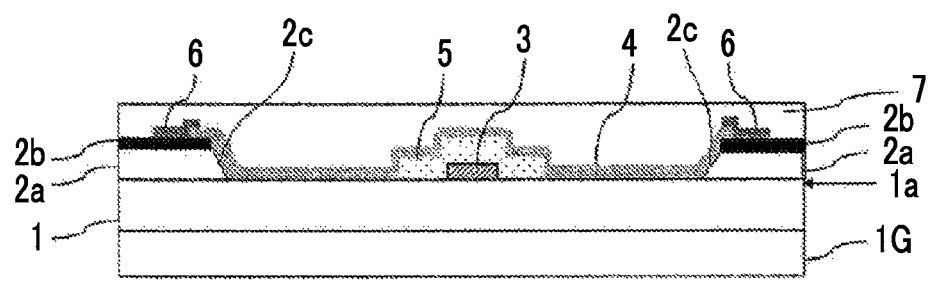
FIG. 6 is a schematic cross-sectional view illustrating the constitution of another example of the touch panel of the present invention for which the base material having a decorative material of the present invention is used.

FIGS. 5 and 6 are cross-sectional views illustrating preferred constitutions of the electrostatic capacitance-type input device of the present invention.

In FIG. 5, an electrostatic capacitance-type input device 10 is constituted of a front plate (cover glass) 1G, a decorative material 2a, a light-blocking layer 2b, a first transparent electrode pattern 3, a second transparent electrode pattern 4, an insulating layer 5, a conductive element 6, and a transparent protective layer 7. The decorative material 2a is provided with an inclined portion 2c, and the decorative material 2a is formed so that the thickness thereof decreases toward the inside of the cover glass 1G.

In another example of the electrostatic capacitance-type input device illustrated in FIG. 6, a film material 1 is further provided between the cover glass 1G and the decorative material 2a in addition to the constitution of the electrostatic capacitance-type input device 10. That is, the cover glass 1G may be provided on a surface of the film material 1 opposite to the surface which is provided with the first transparent electrode pattern 3 and the like. In this embodiment, the film material 1 and/or the cover glass 1G constitute a "base material".

The film material 1 and/or the cover glass 1G are preferably constituted of a transmissive base material. As the transmissive base material, it is also possible to use any one of a base material in which the following decorative material 2a is provided on the cover glass 1G and a base material in which the cover glass 1G, the film material 1, and the following decorative material 2a are provided in this order.

The base material in which the decorative material 2a is provided on the cover glass 1G is preferable for the thickness reduction of touch panels. A base material in which the decorative material 2a is provided on the film material 1 and the laminate is attached to the cover glass 1G is preferable for the productivity of touch panels.

As the cover glass 1G, it is possible to use reinforced glass or the like represented by Corning's GORILLA glass.

In addition, in FIGS. 5 and 6, the side of the film material 1 and/or the cover glass 1G which is provided with the respective elements (the upper side in FIGS. 5 and 6) is called a non-contact surface 1a. In the electrostatic capacitance-type input device, information is input by touching the contact surface of the film material 1 and/or the cover glass 1G (the surface opposite to the non-contact surface 1a (the surface on the operation side), the lower side in FIGS. 5 and 6) with a finger or the like.

The non-contact surface 1a of the film material 1 and/or the cover glass 1G is provided with the decorative material 2a and the light-blocking layer 2b. The decorative material 2a and the light-blocking layer 2b are frame-like patterns around a translucent region (display region) formed on the non-contact surface 1a side of the film material 1 and/or the cover glass 1G. The decorative material 2a and the light-blocking layer 2b are formed in order to prevent routing circuits and the like from being visible or in order for decoration.

In the electrostatic capacitance-type input device, it is possible to provide a wire extraction opening not illustrated. In a case in which a base material having a decorative material for the electrostatic capacitance-type input device having a wire extraction opening is formed, the decorative material 2a may be formed using a liquid resist for forming the decorative material or screen printing ink. A base material having a decorative material-covered which has a wire extraction opening is preferably used from the viewpoint of easily preventing the contamination of the base material rear side.

On the non-contact surface 1a side of the film material 1 and/or the cover glass 1G, a plurality of first transparent electrode patterns 3 formed of a plurality of pad portions extending in a first direction through connection portions, a plurality of second transparent electrode patterns 4 which are electrically insulated from the first transparent electrode patterns 3 and are made up of a plurality of pad portions extending in a direction perpendicular to the first direction, and an insulating layer 5 that electrically insulates the first transparent electrode patterns 3 and the second transparent electrode patterns 4 are formed. The first transparent electrode patterns 3, the second transparent electrode patterns 4, and the conductive element 6 can be produced using, for example, a transmissive conductive metal oxide such as indium tin oxide (ITO) or indium zinc oxide (IZO). Examples of such a metal film include ITO films; metal films of Al, Zn, Cu, Fe, Ni, Cr, Mo, and the like; metallic oxide films such as $SiO_2$; and the like. At this time, the film thicknesses of the respective elements can be set to 10 to 200 nm. In addition, it is also possible to reduce electrical resistance in order to turn amorphous ITO films into crystalline ITO films by means of sintering. In addition, the first transparent electrode patterns 3, the second transparent electrode patterns 4, and the conductive element 6 can also be manufactured using a transfer film having a decorative material for which a conductive fiber is used. Additionally, in a case in which a first conductive pattern or the like is formed using ITO or the like, it is possible to refer to Paragraphs "0014" to "0016" of JP4506785B.

In addition, at least one of the first transparent electrode patterns 3 or the second transparent electrode patterns 4 can be installed so as to astride both regions of the non-contact surface 1a and the light-blocking layer 2b on the non-contact surface 1a and the surface of the light-blocking layer 2b opposite to the film material 1 and/or the cover glass 1G (the upper side in FIGS. 5 and 6). FIGS. 5 and 6 illustrate views in which the second transparent electrode patterns 4 are installed so as to astride both regions of the non-contact surface 1a and the light-blocking layer 2b on the non-contact surface 1a and the surface of the light-blocking layer 2b opposite to the film material 1 and/or the cover glass 1G (the upper side in FIGS. 5 and 6) and the side surface of the decorative material 2a is covered with the second transparent electrode patterns 4. Here, it is possible to set the width of the decorative material 2a to be narrower than the width of the light-blocking layer 2b. In this case, it is possible to install at least one of the first transparent electrode patterns 3 or the second transparent electrode patterns 4 so as to astride the regions of the non-contact surface 1a, the decorative material 2a, and the light-blocking layer 2b on the non-contact surface 1a and the surfaces of the decorative material 2a and the light-blocking layer 2b opposite to the film material 1 and/or the cover glass 1G. Even in a case in which the transfer film is laminated so as to astride a decorative material including the decorative material 2a and the light-blocking layer 2b which have a constant thickness and the non-contact surface 1a, when the film transfer material (particularly the film transfer material having the thermoplastic resin layer) is used, it becomes possible to laminate the transfer material with simple steps and no use of an expensive facility such as a vacuum laminator without generating bubbles in the partial boundary of the decorative material 2a.

The first transparent electrode patterns 3 and the second transparent electrode patterns 4 will be described using FIG. 8.

Figure 8:
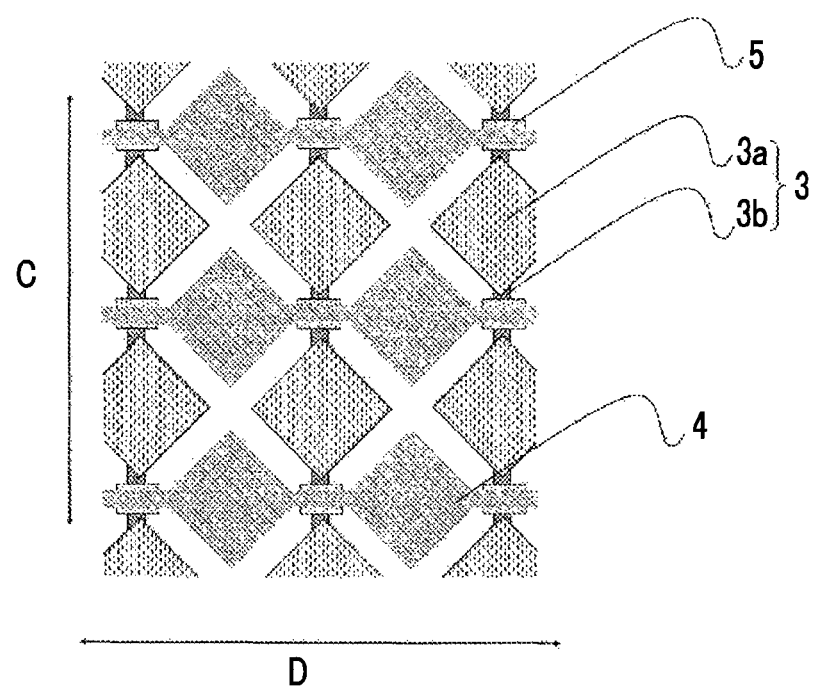
FIG. 8 is an explanatory view illustrating an example of first transparent electrode patterns and second transparent electrode patterns.

FIG. 8 is an explanatory view illustrating an example of the first transparent electrode patterns and the second transparent electrode patterns in the present invention.

As illustrated in FIG. 8, the first transparent electrode patterns 3 are formed of pad portions 3a extending in a first direction C through connection portions 3b. In addition, the second transparent electrode patterns 4 are electrically insulated from the first transparent electrode patterns 3 due to the insulating layer 5 and are constituted of a plurality of pad portions extending in a direction perpendicular to the first direction C (a second direction D in FIG. 8). Here, in a case in which the first transparent electrode patterns 3 are formed, the pad portions 3a and the connection portions 3b may be produced as an integrated body, or the pad portions 3a and the second transparent electrode patterns 4 may be produced (patterned) as an integrated body by producing only the connection portions 3b. In a case in which the pad portions 3a and the second transparent electrode patterns 4 are produced (patterned) as an integrated body, a part of the connection portion 3b and a part of the pad portion 3a are coupled to each other as illustrated in FIG. 8, and the respective layers are formed so that the first transparent electrode patterns 3 and the second transparent electrode patterns 4 are electrically insulated from each other using the insulating layer 5.

In FIGS. 5 and 6, the conductive element 6 is installed on the surface of the light-blocking layer 2b opposite to the non-contact surface 1a (the upper side in FIGS. 5 and 6). The conductive element 6 is electrically connected to at least one of the first transparent electrode patterns 3 or the second transparent electrode patterns 4 and is an element other than the first transparent electrode patterns 3 and the second transparent electrode patterns 4. FIGS. 5 and 6 illustrate views in which the conductive element 6 is connected to the second transparent electrode patterns 4.

In addition, in FIGS. 5 and 6, the transparent protective layer 7 is installed so as to cover all of the respective constituent elements. The transparent protective layer 7 may be constituted so as to cover only part of the respective constituent elements. The insulating layer 5 and the transparent protective layer 7 may be the same material or different materials. The material constituting the insulating layer 5 and the transparent protective layer 7 is preferably a material having high surface hardness and high heat resistance, and well-known photosensitive siloxane resin materials, acrylic resin materials, and the like can be used.

Figure 9:
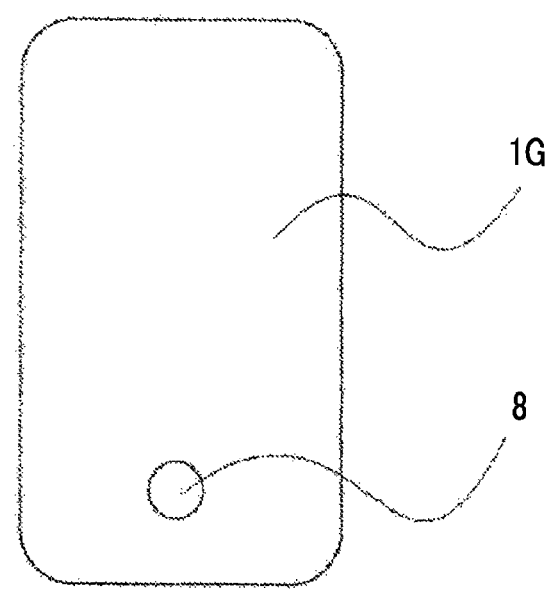
FIG. 9 is a top view illustrating an example of cover glass having an opening portion formed therein.
Figure 13:
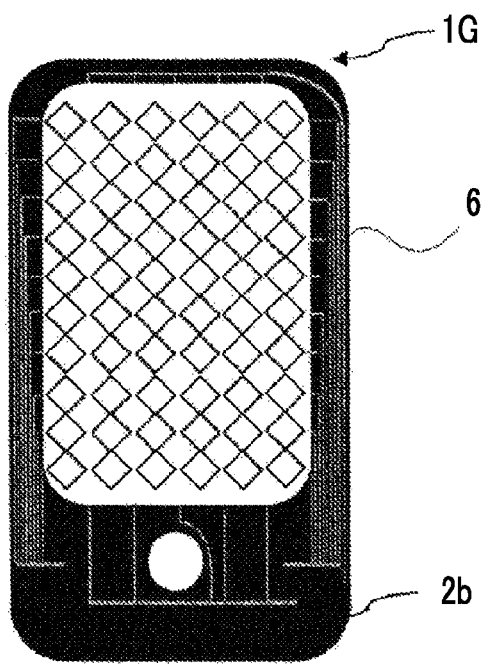
FIG. 13 is a top view illustrating an example of the touch panel of the present invention in which a conductive element other than the first and second transparent electrode patterns is formed.

Examples of aspects formed by the steps in the manufacturing method of the present invention include aspects of FIGS. 9 and 13.

Figure 10:
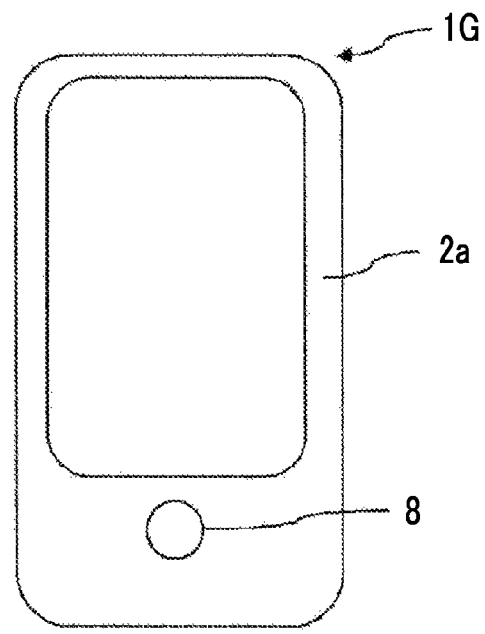
FIG. 10 is a top view illustrating an example of decorative material cover glass.
Figure 11:
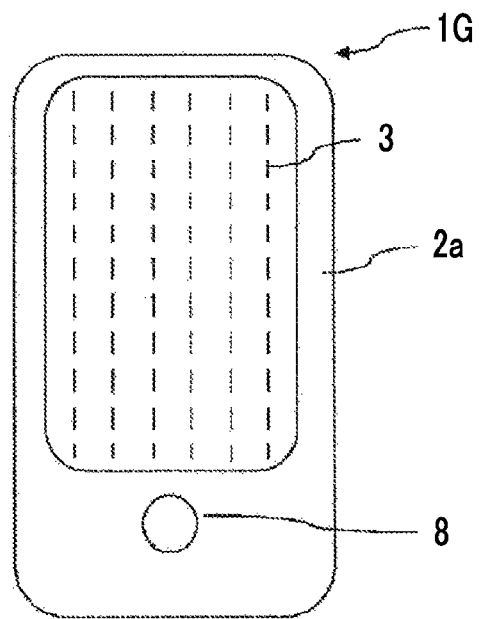
FIG. 11 is a top view illustrating an example of the touch panel of the present invention in which the first transparent electrode patterns are formed.
Figure 12:
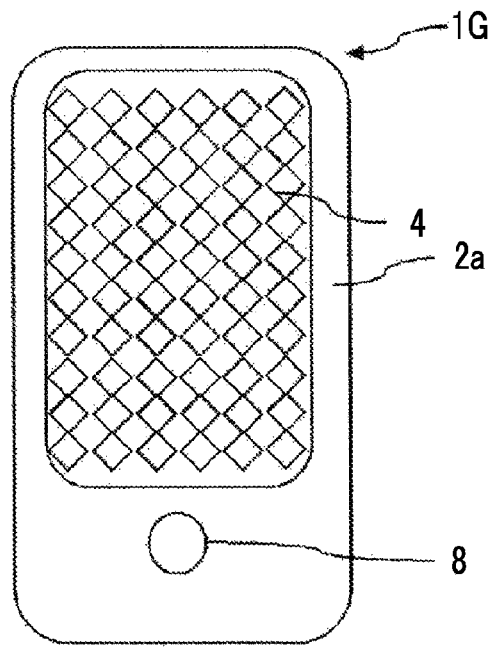
FIG. 12 is a top view illustrating an example of the touch panel of the present invention in which the first and second transparent electrode patterns are formed.

FIG. 9 is a top view illustrating an example of the cover glass 1G having the opening portion 8 formed therein. FIG. 10 is a top view illustrating an example of a state in which the decorative material 2a is formed. FIG. 11 is a top view illustrating an example of a state in which the first transparent electrode patterns 3 are formed. FIG. 12 is a top view illustrating an example of a state in which the second transparent electrode patterns 4 are formed. FIG. 13 is a top view illustrating an example of a state in which the conductive element 6 other than the first and second transparent electrode patterns is formed. These drawings simply illustrate specified examples of the above description, and the scope of the present invention is not interpreted to be limited by these drawings.

To the electrostatic capacitance-type input device and an image display device including this electrostatic capacitance-type input device as a constituent element, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

(Information Display Device)

An information display device of the present invention has the touch panel of the present invention. The touch panel of the present invention can be effectively used as an OGS-type touch panel.

An information display device capable of using the touch panel of the present invention is preferably a mobile device, and examples thereof include the following information display device.

iPhone4 (registered trademark), iPad (registered trademark) (all manufactured by Apple Inc.), Xperia (SO-01B) (manufactured by Sony Ericson Mobile Communication Company), Galaxy S (SC-02B), Galaxy Tab (SC-01C) (all manufactured by Samsung Corporation), BlackBerry 8707h (manufactured by Research In Motion), Kindle (manufactured by Amazon.com, Inc.), and Kobo Touch (manufactured by Rakuten, Inc.).

EXAMPLES

Hereinafter, the characteristics of the present invention will be more specifically described using examples and comparative examples. Materials, amounts used, proportions, processing contents, processing orders, and the like described in the following examples can be appropriately modified within the scope of the gist of the present invention. Therefore, the scope of the present invention is not interpreted to be limited by specific examples described below.

Meanwhile, unless particularly otherwise described, "parts" represents "parts by mass", and "%" or "wt %" represents "% by mass".

Example 1

<Production of Decorative Material>
—Production of Coating Fluid—

| | |
|---|---|
| Resin KE-581U (silica-added compound-type vinyl methyl silicone rubber manufactured by Shin-Etsu Chemical Co., Ltd., the content percentage of silica: 33%, a compound having the structure represented by Formula 2 and the structure represented by Formula 3, $R^b$: a methyl group, $R^c$: a methyl group) | 150 parts |
| Crosslinking agent C25B (manufactured by Shin-Etsu Chemical Co., Ltd., a compound having the structure represented by Formula 1 and the structure represented by Formula 3, $R^a$: a methyl group, $R^c$: a methyl group, the functional group equivalent of Si—H: 3 mmol/g, the amount of the structure represented by Formula 1 in the compound:the amount of the structure represented by Formula 3 in the compound = 22:78 (molar ratio)) | 3.0 parts |
| Pt catalyst C25A (manufactured by Shin-Etsu Chemical Co., Ltd.) | 0.75 parts |
| White pigment CR97 (a titanium oxide pigment, manufactured by Ishihara Sangyo Kaisha, Ltd.) | 100 parts |
| Xylene | 500 parts |

The above-described components were mixed for one hour using a kneader, thereby obtaining fluidic pigment paste. The pigment paste was extracted and was diluted with xylene so that the solid content reached 25%, thereby obtaining a coating fluid L1.

[Production of Base Material Having Decorative Material]

Although it is possible to form a decorative material on a glass substrate using a variety of well-known printing methods such as ink jet printing or screen printing by adjusting the amount of the solvent in the coating fluid, base material having a decorative material was produced using a transferring method in which multi-layer printing was not required and steps were simple.

<Production of Transfer Material for Forming Decorative Material>

<<Preparation of Peeling Film>>

The following peeling film was prepared as a temporary support covered with a peeling layer of a transfer material.

UNIPIL TR6 (manufactured by Unitika Ltd., an olefin-based peeling layer was provided on a 75 μm-thick PET film, a matting agent protruded 200 nm from the peeling layer)

<<Preparation of Protective Film>>

Next, the following protective film was prepared.

ALPAN E-501 (manufactured by Kao Corporation, 12 μm-thick polypropylene film)

<Production of Coloring Layer on Temporary Support>

A coating fluid L1 for forming a coloring layer was applied onto the peeling layer on the temporary support covered with the peeling layer using an extrusion-type coater so that the dried thickness reached 35.0 μm and was dried. The above-described protective film was pressed on the coloring layer.

In this manner, a transfer material F1 which was a laminate of the temporary support and the coloring layer was produced.

<Production of Base Material Having Decorative Material>

A glass substrate made of reinforced glass (300 mm×400 mm×0.7 mm) having an opening portion (15 mmφ) formed therein as illustrated in FIG. 7 was washed. Specifically, the glass substrate was brushed with a rotary brush having nylon bristles while blowing a glass detergent liquid having a temperature adjusted to 25° C. to the reinforced glass by means of showering for 20 seconds. This glass substrate was preliminarily heated at 90° C. for two minutes in a base material preliminary heating device.

The transfer material F1 was shaped into a frame shape having sizes corresponding to the four sides of the glass substrate and was transferred onto the glass substrate by peeling off the protective film. After that, the temporary support of the transfer material F1 was peeled off. In order to cure the coloring layer, the transferred coloring layer was heated together with the glass substrate (base material) at 150° C. for 30 minutes and, furthermore, at 240° C. for 60 minutes. As a result, a base material having a decorative material which has a decorative material formed by heating the coloring layer was obtained.

<Coloration Evaluation>

The reflection spectrum of the base material having a decorative material on the glass side was measured using a spectrophotometer equipped with an integrating sphere, and the chromatic coordinate L*a*b* was computed on the basis of the reflection spectrum. L* mainly indicates brightness, a* mainly indicates a red tint, and b* mainly indicates a yellow tint.

b* which is easily influenced by a thermal treatment was used as an index, and changes before and after a thermal treatment were evaluated in the following manner.

A: b*≤0.5
B: 0.5<b*≤1.0
C: 1.0<b*≤1.5
D: b*>1.5

As the coloration evaluation, the A, B, and C-system evaluation is practically required, and the evaluation of A or B is preferred, and the evaluation of A is more preferred. The obtained results are shown in Table 1 below.

<Crack Evaluation>

In the production of the substrate having a decorative material, whether or not cracks were generated in a thermally-treated decorative layer was visually observed, and decorative layers in which cracks were not generated was evaluated as A, and decorative layers in which cracks were generated was evaluated as B.

The obtained results are shown in Table 1 below.

Examples 2 to 28 and Comparative Examples 1 to 6

Examples 2 to 28 and Comparative Examples 1 to 6 were carried out in the same manner as Example 1 except for the fact that the components described in Example 1 were changed to components shown in Table 1 and adjustment was made using xylene so that the solid contents of coating fluids reached 25%.

The obtained results are shown in Table 1 below. Meanwhile, the unit of the amounts of the respective components in Table 1 is 'parts by mass'.

TABLE 1

| | Coating fluid | Crosslinking agent | | Resin | | Catalyst/photopolymerization initiator | |
|---|---|---|---|---|---|---|---|
| | | Type | Amount | Type | Amount | Type | Amount |
| Example 1 | L1 | C25B | 3 | KE581U | 150 | C25A | 0.75 |
| Example 2 | L2 | C25B | 3 | KE167U | 150 | C25A | 0.75 |
| Example 3 | L3 | KF9901 | 3 | KE5634U | 150 | C25A | 0.75 |
| Example 4 | L4 | KF9901 | 3 | KE153U | 150 | C25A | 0.75 |
| Example 5 | L5 | C25B | 3 | KE581U | 150 | C25A | 0.75 |
| Example 6 | L6 | C25B | 3 | KE167U | 150 | C25A | 0.75 |
| Example 7 | L7 | C25B | 3 | KE581U | 150 | C25A | 0.75 |
| Example 8 | L8 | KF9901 | 3 | KE581U | 150 | C25A | 0.75 |
| Example 9 | L9 | KF9901 | 3 | KE581U | 150 | C25A | 0.75 |
| Example 10 | L10 | C25B | 3 | KE581U | 150 | C25A | 0.75 |
| Example 11 | L11 | C25B | 3 | KE581U | 150 | C25A | 0.75 |
| Example 12 | L12 | C25B | 3 | KE581U | 150 | C25A | 0.75 |
| Example 13 | L13 | C25B | 3 | KE581U | 150 | C25A | 0.75 |
| Example 14 | L14 | C25B | 3 | KE581U | 150 | C25A | 0.75 |
| Example 15 | L15 | C25B | 3 | KE581U | 150 | C25A | 0.75 |
| Example 16 | L16 | C25B | 3 | KE581U | 150 | C25A | 0.75 |
| Example 17 | L17 | C25B | 3 | KE581U | 150 | C25A | 0.75 |
| Example 18 | L18 | C25B | 3 | KE581U | 150 | C25A | 0.75 |
| Example 19 | L19 | C25B | 3 | KE581U | 150 | C25A | 0.75 |
| Example 20 | L20 | C25B | 3 | KE581U | 150 | C25A | 0.75 |
| Example 21 | L21 | C25B | 3 | KE581U | 150 | C25A | 0.75 |
| Example 22 | L22 | C25B | 3 | KE581U | 150 | C25A | 0.75 |

TABLE 1-continued

| | | | | | | | |
|---|---|---|---|---|---|---|---|
| Example 23 | L23 | C25B | 3 | KE581U | 150 | C25A | 0.75 |
| Example 24 | L24 | C25B | 3 | KE581U | 150 | C25A | 0.75 |
| Example 25 | L25 | KF99 | 1 | KE581U | 200 | C25A | 1.50 |
| Example 26 | L26 | C25B | 50 | KE581U | 100 | C25A | 3.00 |
| Example 27 | L27 | KF9901 | 5 | KE581U | 50 | C25A | 3.00 |
| Example 28 | L28 | KF99 | 3 | KE581U | 300 | C25A | 0.30 |
| Comparative Example 1 | | X-40-9246 | 5 | KR251 | 150 | D15 | 0.20 |
| Comparative Example 2 | | DPHA | 50 | BR-80 | 100 | OXE-01 | 5.00 |
| Comparative Example 3 | | DPHA | 50 | UR-4410 | 250 | OXE-01 | 5.00 |
| Comparative Example 4 | | DPHA | 50 | BR-80 | 100 | OXE-01 | 5.00 |
| Comparative Example 5 | | DPHA | 50 | UR-4410 | 250 | OXE-01 | 5.00 |
| Comparative Example 6 | | DPHA | 50 | KE581U | 150 | OXE-01 | 5.00 |

| | Pigment dispersion liquid | | | | | | | |
|---|---|---|---|---|---|---|---|---|
| | Pigment | Amount | Dispersant | Amount | Xylene | Dispersibility evaluation | Coloration evaluation | Crack evaluation |
| Example 1 | CR97 | 100 | — | — | — | — | A | A |
| Example 2 | CR97 | 100 | — | — | — | — | A | A |
| Example 3 | CR97 | 100 | — | — | — | — | A | A |
| Example 4 | CR97 | 100 | — | — | — | — | A | A |
| Example 5 | CR97 | 100 | D-1 | 10 | 35 | A | A | A |
| Example 6 | CR97 | 100 | D-2 | 10 | 35 | A | A | A |
| Example 7 | CR97 | 100 | D-3 | 5 | 40 | A | A | A |
| Example 8 | CR97 | 100 | D-4 | 10 | 35 | A | A | A |
| Example 9 | CR97 | 100 | D-5 | 5 | 40 | A | A | A |
| Example 10 | CR97 | 100 | D-6 | 10 | 35 | A | A | A |
| Example 11 | CR97 | 100 | D-7 | 10 | 35 | B | A | A |
| Example 12 | CR97 | 100 | D-8 | 10 | 35 | B | A | A |
| Example 13 | CR97 | 100 | D-9 | 10 | 35 | B | A | A |
| Example 14 | CR97 | 100 | D-10 | 10 | 35 | B | A | A |
| Example 15 | CR97 | 100 | D-11 | 10 | 35 | B | A | A |
| Example 16 | CR97 | 100 | D-12 | 10 | 35 | B | A | A |
| Example 17 | CR97 | 100 | D-13 | 10 | 35 | B | B | A |
| Example 18 | CR97 | 100 | D-14 | 10 | 35 | C | C | A |
| Example 19 | PB7 | 100 | D-3 | 10 | 35 | A | A | A |
| Example 20 | Aluminum | 100 | D-3 | 10 | 35 | A | A | A |
| Example 21 | PB15:6 | 100 | D-3 | 10 | 35 | A | A | A |
| Example 22 | PG7 | 100 | D-3 | 10 | 35 | A | A | A |
| Example 23 | PB7 | 100 | — | — | — | — | A | A |
| Example 24 | Aluminum | 100 | — | — | — | — | A | A |
| Example 25 | CR97 | 100 | D-5 | 5 | 35 | A | A | A |
| Example 26 | CR97 | 100 | D-5 | 10 | 35 | A | A | A |
| Example 27 | CR97 | 100 | D-6 | 10 | 35 | A | A | A |
| Example 28 | CR97 | 100 | D-6 | 15 | 35 | A | A | A |
| Comparative Example 1 | CR97 | 25 | D-1 | 2.5 | 8 | A | A | B |
| Comparative Example 2 | CR97 | 100 | D-1 | 10 | 35 | A | D | A |
| Comparative Example 3 | CR97 | 100 | D-1 | 10 | 35 | A | D | A |
| Comparative Example 4 | CR97 | 100 | D-13 | 10 | 35 | B | D | A |
| Comparative Example 5 | CR97 | 100 | D-14 | 10 | 35 | C | D | A |
| Comparative Example 6 | CR97 | 100 | D-1 | 10 | 35 | A | D | A |

The details of abbreviations in Table 1 which had not been described above are as described below.

KF9901: A compound having the structure represented by Formula 1 and the structure represented by Formula 3, a hydrosilane compound, manufactured by Shin-Etsu Chemical Co., Ltd., $R^a$: a methyl group, $R^c$: a methyl group, the functional group equivalent of Si—H: 7 mmol/g, the amount of the structure represented by Formula 1 in the compound: the amount of the structure represented by Formula 3 in the compound=48:52 (molar ratio)

KF99: A compound having the structure represented by Formula 1, a methyl hydrogen silicone compound, manufactured by Shin-Etsu Chemical Co., Ltd., $R^a$: a methyl group, the functional group equivalent of Si—H: 16.7 mmol/g X-40-9246: An alkoxysilane compound not having the structure represented by Formula 1 and the structure represented by Formula 2, manufactured by Shin-Etsu Chemical Co., Ltd.

DPHA: A mixture of dipentaerythritol pentaacrylate and dipentaerythritol hexaacrylate, manufactured by Nippon Kayaku Co., Ltd., a mixture not having the structure represented by Formula 1 and the structure represented by Formula 2

KE167U: A compound having the structure represented by Formula 2 and the structure represented by Formula 3, phenyl vinyl methyl silicone rubber, manufactured by Shin-Etsu Chemical Co., Ltd., $R^b$: a methyl group or a phenyl group, $R^c$: a methyl group or a phenyl group KE5634U: A compound having the structure represented by Formula 2 and the structure represented by Formula 3, vinyl methyl silicone rubber, manufactured by Shin-Etsu Chemical Co., Ltd.

KE153U: A compound having the structure represented by Formula 2 and the structure represented by Formula 3, vinyl methyl silicone rubber, manufactured by Shin-Etsu Chemical Co., Ltd.

KR251: A silanol compound not having the structure represented by Formula 1 and the structure represented by Formula 2, manufactured by Shin-Etsu Chemical Co., Ltd.

BR-80: DIANAL BR-80, an acrylic resin manufactured by Mitsubishi Rayon Co., Ltd., an acrylic resin not having the structure represented by Formula 1 and the structure represented by Formula 2

UR-4410: VYLON UR-4410, polyester manufactured by Toyobo Co., Ltd., polyester not having the structure represented by Formula 1 and the structure represented by Formula 2

D-15: Zn catalyst, manufactured by Shin-Etsu Chemical Co., Ltd.

OXE-01: Photopolymerization initiator, IRGACURE OXE-01, manufactured by BASF

PB7: A carbon black pigment (C.I. Pigment Black 7)

PB15:6: A copper phthalocyan pigment (C.I. Pigment Blue 15:6)

ALUMI: An aluminum pigment (C.I. Pigment Metal 1)

<Production of Pigment Dispersion Liquid>

—Material of Dispersing Agent—

A-1 and A-2 used as the A component (mercapto-modified dimethylpolysiloxane) in the material of the dispersing agent were KF-2001 (manufactured by Shin-Etsu Chemical Co., Ltd.) and KF-2004 (manufactured by Shin-Etsu Chemical Co., Ltd.) respectively.

A-1 and A-2 were respectively a structure represented by the following formula ($R^4$ represents an arbitrary linking group, a1 and a2 represent a natural number, and the repeating units in parentheses do not always need to be bonded to each other in the order illustrated in the following formula and may be bonded to each other in an arbitrary order), and the functional group equivalents of A-1 and A-2 were 1,900 (g/mol) and 30,000 (g/mol) respectively.

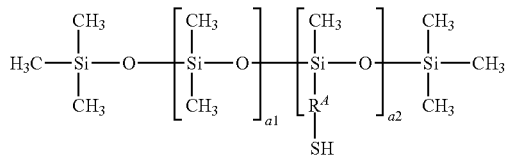

B-1, B-2, and B-3 used as the B component (a silicone macromonomer) in the material of the dispersing agent were X-22-174ASX (manufactured by Shin-Etsu Chemical Co., Ltd.), X-22-174BX (manufactured by Shin-Etsu Chemical Co., Ltd.), and KF-2012 (manufactured by Shin-Etsu Chemical Co., Ltd.) respectively. B-1, B-2, and B-3 were respectively a structure represented by the following general formula (R' represents an arbitrary substituent, R" represents an arbitrary linking group, and n represents natural number),
and the functional group equivalents of B-1, B-2, and B-3 were 900 (g/mol), 2,300 (g/mol), and 4,600 (g/mol) respectively.

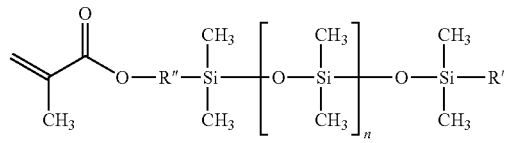

C-1 to C-6 used as the C component (a polymerization component having a pigment adsorption site) in the material of the dispersing agent were compounds having a structure represented by the following general formula.

In the formula, structures represented by R and X in C-1 to C-6 were respectively shown in Table 2 below.

TABLE 2

| | R | X |
|---|---|---|
| C-1 | $CH_3$ | COOH |
| C-2 | $CH_3$ | $COOC_2H_4OCOC_2H_2COOH$ |
| C-3 | $CH_2COOH$ | COOH |
| C-4 | H | $PO_3H_2$ |
| C-5 | $CH_3$ | $CONHCH_2C(CH_3)_2SO_3H$ |
| C-6 | $CH_3$ | $COOC_2H_2N(CH_3)_2$ |

<Synthesis of Dispersing Agent D-1>

A-1 (KF-2001, manufactured by Shin-Etsu Chemical Co., Ltd.) which was mercapto-modified dimethylpolysiloxane, B-1 (X-22-174ASX, manufactured by Shin-Etsu Chemical Co., Ltd.) which was a silicone macromonomer, and C-1 (methacrylic acid) which was a polymerization component having a pigment adsorption site were dissolved in the same amount of propylene glycol monomethyl ether acetate (PG-MEA) as the amount of the dispersant component according to Table 3 below, 0.3 mol % of a polymerization initiator (dimethyl-2,2'-azobis(2-methylpropionate), [V-601], manufactured by Wako Pure Chemical Industries, Ltd.) of all of the polymerization components (A-1, B-1, and C-1) was dissolved in PGMEA, and polymerization was carried out at 80° C. in a nitrogen atmosphere. In the middle of the process, 0.3 mol % of the polymerization initiator (V-601) of all of the polymerization components was added thereto after two hours from the initiation of the polymerization, and polymerization was carried out for a total of four hours. After the polymerization, a purification treatment and drying were carried out, thereby obtaining a dispersing agent D-1.

<Synthesis of Dispersing Agents D-2 to D-12>

Dispersing agents D-2 to D-12 were obtained in the same manner as the dispersing agent D-1 except for the fact that, in the synthesis of the dispersing agent D-1, the A component, the B component, and the C component in the material of the dispersing agent and the ratio (copolymerization ratio) therebetween were changed according to Table 3 below.

Meanwhile, in the synthesis of the dispersing agent D-12, the C component was not added.

<Synthesis of Dispersing Agent D-13>

A dispersing agent D-13 was obtained in the same manner as the dispersing agent D-1 except for the fact that, in the synthesis of the dispersing agent D-1, the A component and the C component in the material of the dispersing agent and the ratio (copolymerization ratio) therebetween were changed according to Table 3 below, and furthermore, a polymerization initiator was added thereto after 22.5% by mass of isobutyl methacrylate (IBMA) was added as a D component instead of the B component.

The dispersing agent D-13 had the same composition as that of a graft-type silicone polymer described in Paragraph "0054" of JP2008-274116A.

<Synthesis of Dispersing Agent D-14>

A dispersing agent D-14 was obtained in the same manner as the dispersing agent D-1 except for the fact that, in the synthesis of the dispersing agent D-1, a polymerization initiator was added thereto after 49.3% by mass of tricyclodecanyl methacrylate (TCDMA), 37.6% by mass of cyclohexyl methacrylate (CHMA), and 13.1% by mass of methyl methacrylate (MMA) were added according to Table 3 instead of the A component, the B component, and the C component in the material of the pigment dispersion liquid.

The dispersing agent D-14 was an example of an ordinary graft-type polymer having a structure not having a mercapto-modified silicone chain.

<Molecular Weight of Dispersing Agents>

The weight-average molecular weights (Mw) and the number-average molecular weights (Mn) of the dispersing agents D-1 to D-12 and the number-average molecular weight (Mn) of the dispersing agent D-14 were measured using gel permeation chromatography (GPC). The results are shown in Table 3 below. The details of columns and the like used in GPC are as described below.

Column: GPC column TSKgelSuper HZM-H (manufactured by Tosoh Corporation)
Solvent: Tetrahydrofuran
Standard substance: monodispersed polystyrene were dispersed for 30 minutes in a beads mill using zirconia beads having a diameter of 0.5 mm, thereby obtaining a dispersing agent.

The viscosity of the obtained pigment dispersion liquid was measured in an environment of 25° C. using a cone-plate viscometer (manufactured by Toki Sangyo Co., Ltd., RE-85L).

The dispersibility of the dispersing agent was evaluated using the following standards.

Dispersing agents in which the viscosity of the pigment dispersion liquid was equal to or less than twice the initial viscosity after one week in an environment of 25° C. were evaluated as A, dispersing agents in which the viscosity was more than twice and equal to or less than triple the initial viscosity were evaluated as B, and dispersing agents in which the viscosity was more than triple the initial viscosity were evaluated as C.

Regarding the dispersibility evaluation, the evaluation of A or B is preferred, and the evaluation of A is more preferred.

<Production of Decorative Material>

A coating fluid L19 for forming the coloring layer was applied onto the peeling layer on the temporary support covered with the peeling layer using an extrusion-type coater so that the dried film thickness reached 3.0 μm and was dried. Furthermore, a coating fluid L10 for forming the coloring layer was applied so that the thickness reached 35.0 μm and was dried. The above-described protective film was pressed on the coloring layer formed of the coating fluid L10. A transfer material F2 having the coloring layer laminated on the temporary support was produced in the above-described manner.

(Production of Electrostatic Capacitance-type Input Device (Touch Panel))

An electrostatic capacitance-type input device was produced using the method described in JP2014-24316A.

A front plate on which an insulating layer (transparent protective layer) was laminated so as to cover all of a base

TABLE 3

| | A component | | B component | | C component | | D component | | Molecular weight | |
|---|---|---|---|---|---|---|---|---|---|---|
| | Type | [wt %] | Type | [wt %] | Type | [wt %] | Type | [wt %] | Mw (10$^4$) | Mn (10$^4$) |
| D-1 | A-1 | 88.4 | B-1 | 8.4 | C-1 | 3.2 | — | — | 2.5 | 1.3 |
| D-2 | A-1 | 73.2 | B-1 | 26.0 | C-1 | 0.8 | — | — | 2.5 | 1.3 |
| D-3 | A-1 | 71.7 | B-2 | 26.0 | C-1 | 2.3 | — | — | 3.4 | 1.6 |
| D-4 | A-1 | 57.3 | B-2 | 41.6 | C-1 | 1.0 | — | — | 3.4 | 1.6 |
| D-5 | A-1 | 56.9 | B-3 | 41.3 | C-1 | 1.8 | — | — | 4.4 | 2.3 |
| D-6 | A-1 | 40.5 | B-3 | 58.8 | C-1 | 0.7 | — | — | 4.4 | 2.3 |
| D-7 | A-1 | 77.1 | B-1 | 18.3 | C-2 | 4.7 | — | — | 2.5 | 1.3 |
| D-8 | A-1 | 79.3 | B-1 | 18.8 | C-3 | 1.9 | — | — | 2.0 | 0.8 |
| D-9 | A-1 | 79.0 | B-1 | 18.7 | C-4 | 2.2 | — | — | 2.5 | 1.3 |
| D-10 | A-1 | 88.4 | B-1 | 8.4 | C-5 | 3.2 | — | — | 2.5 | 1.3 |
| D-11 | A-1 | 76.8 | B-1 | 18.2 | C-6 | 5.0 | — | — | 2.5 | 1.3 |
| D-12 | A-1 | 73.4 | B-2 | 26.6 | — | — | — | — | 3.3 | 1.2 |
| D-13 | A-1 | 70.0 | — | — | C-1 | 7.5 | IBMA | 22.5 | — | — |
| D-14 | — | — | — | — | — | — | TCDMA/CHMA/MMA = 49.3/37.6/13.1 | | — | 1.0 |

Since A-1 had a higher SH content percentage than A-2, it is considered that the performance was superior in a case in which A-1 was used as the A component in the material of the dispersing agent to a case in which A-2 was used.

<Production of Pigment Dispersion Liquid>

A pigment, a dispersing agent (dispersant), and xylene were mixed together in the proportions shown in Table 1 and material having a decorative material formed using the transfer material F2, the first transparent electrode patterns, insulating layer patterns, the second transparent electrode patterns, and a conductive element other than the first and second transparent electrode patterns as illustrated in FIG. 5 was obtained. The obtained front plate can be used as electrostatic capacitance-type input devices.

<Production of Image Display Device (Information Display Device Having Touch Panel)>

A previously-manufactured front plate (electrostatic capacitance-type input device) was attached to a liquid crystal display device manufactured using the method described in Paragraphs "0097" to "0119" of JP2009-47936A, and an image display device including the electrostatic capacitance-type input device was produced using a well-known method.

<Overall Evaluation of Front Plate and Image Display Device>

In the front plate (electrostatic capacitance-type input device) on which a white decorative material, a light-blocking layer, the first transparent electrode patterns, insulating layer patterns, the second transparent electrode patterns, and a conductive element other than the first and second transparent electrode patterns were formed, the opening portion and the rear surface were not contaminated and thus washing was easy, and a problem of other members being contaminated was not caused in the respective steps described above.

In addition, the white decorative material did not have any pin holes and had no problem with whiteness and unevenness. Similarly, the light-blocking layer did not have any pin holes and had excellent light-blocking properties.

In addition, the first transparent electrode patterns, the second transparent electrode patterns, and the conductive element other than the first and second transparent electrode patterns respectively had no problem with conducting properties, and the first transparent electrode patterns were insulated from the second transparent electrode patterns.

Furthermore, the transparent protective layer also did not have any defects such as air bubbles, and image display devices (information display devices having a touch panel) having excellent display characteristics and operability could be obtained.

EXPLANATION OF REFERENCES

1: film material
1G; cover glass
2a: decorative material
2b: light-blocking layer
2c: inclined portion
3: conductive layer (first transparent electrode pattern)
3a: pad portion
3b: connection portion
4: conductive layer (second transparent electrode pattern)
5: insulating layer
6: conductive layer (another conductive element)
7; transparent protective layer
8: opening portion
10: electrostatic capacitance-type input device
C: first direction
D: second direction

What is claimed is:
1. A coloring composition for decoration comprising:
a compound having at least a structure represented by Formula 1 below in a molecule;
a compound having at least a structure represented by Formula 2 below in a molecule;
a pigment; and
a dispersing agent represented by Formula 4 below,

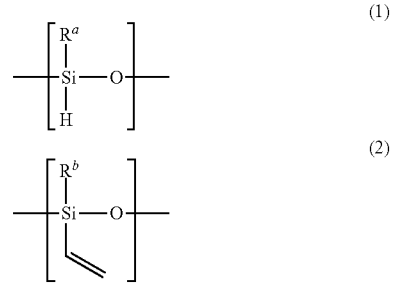

in Formulae 1 and 2, $R^a$ represents a hydrogen atom, a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms, and $R^b$ represents a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 2 to 20 carbon atoms, an aryl group having 6 to 20 carbon atoms, or an aralkyl group having 7 to 20 carbon atoms,

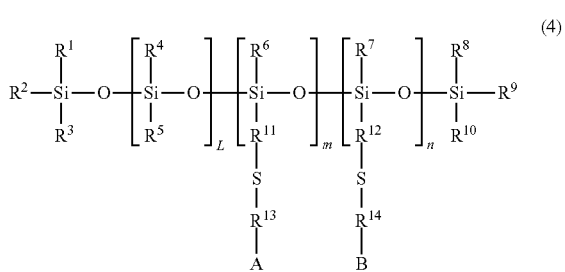

in Formula 4, $R^1$ to $R^{10}$ each independently represent a hydrogen atom, a hydroxy group, an aryl group, or an alkyl group having 1 to 3 carbon atoms,
$R^{11}$ and $R^{12}$ each independently represent an arylene group or an alkylene group having 1 to 3 carbon atoms,
$R^{13}$ and $R^{14}$ each independently represent a single bond or a divalent organic linking group,
A represents a group having a pigment adsorption site,
B represents a group having a structure represented by Formula 5 below,
L and n each independently represent an integer of 1 or more, and
m represents an integer of 0 or more,

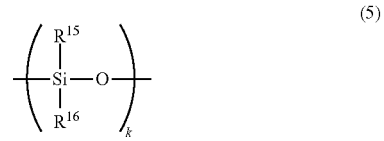

in Formula 5, $R^{15}$ and $R^{16}$ each independently represent a hydrogen atom, a hydroxy group, an aryl group, or an alkyl group having 1 to 3 carbon atoms, and k represents an integer of 1 or more.

2. The coloring composition for decoration according to claim 1,
wherein the compound having at least the structure represented by Formula 1 in the molecule further has a structure represented by Formula 3 below,

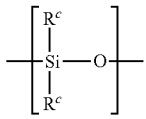
(3)

in Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

3. The coloring composition for decoration according to claim 2,
wherein the compound having at least the structure represented by Formula 2 in the molecule further has the structure represented by Formula 3 below,

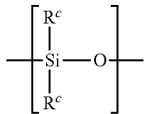
(3)

in Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

4. The coloring composition for decoration according to claim 1,
wherein the compound having at least the structure represented by Formula 2 in the molecule further has the structure represented by Formula 3 below,

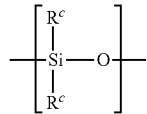
(3)

in Formula 3, $R^c$'s each independently represent a halogen atom, a linear, branched, or cyclic alkoxy group having 1 to 20 carbon atoms, a linear, branched, or cyclic alkyl group having 1 to 20 carbon atoms, a linear, branched, or cyclic alkenyl group having 3 to 20 carbon atoms, an aryl group having 6 to 20 carbon atoms, or an aralkyl group having 7 to 20 carbon atoms.

5. The coloring composition for decoration according to claim 1,
wherein $R^a$ is a hydrogen atom, a methyl group, or a phenyl group, and $R^b$ is a methyl group or a phenyl group.

6. The coloring composition for decoration according to claim 1,
wherein $R^1$ to $R^{10}$ each independently represent a hydrogen atom, a methyl group, or a phenyl group, and $R^{15}$ and $R^{16}$ each independently represent a hydrogen atom, a hydroxy group, a methyl group, or a phenyl group.

7. The coloring composition for decoration according to claim 1,
wherein the pigment is titanium oxide or carbon black.

8. The coloring composition for decoration according to claim 1, further comprising:
a platinum compound.

9. A transfer material for forming a decorative material comprising:
the coloring composition for decoration according to claim 1.

10. A decorative material made of the coloring composition for decoration according to claim 1.

11. A base material having a decorative material comprising:
the decorative material according to claim 10; and
a base material.

12. A touch panel comprising:
the base material having a decorative material according to claim 11.

13. A touch panel comprising:
the decorative material according to claim 10.

14. An information display device comprising:
the touch panel according to claim 13.

* * * * *